United States Patent [19]

Meinhardt et al.

[11] 4,234,435

[45] Nov. 18, 1980

[54] NOVEL CARBOXYLIC ACID ACYLATING AGENTS, DERIVATIVES THEREOF, CONCENTRATE AND LUBRICANT COMPOSITIONS CONTAINING THE SAME, AND PROCESSES FOR THEIR PREPARATION

[75] Inventors: Norman A. Meinhardt, Lyndhurst; Kirk E. Davis, Euclid, both of Ohio

[73] Assignee: The Lubrizol Corporation, Wickliffe, Ohio

[21] Appl. No.: 14,510

[22] Filed: Feb. 23, 1979

Related U.S. Application Data

[63] Continuation-in-part of Ser. No. 772,161, Feb. 25, 1977, abandoned.

[51] Int. Cl.[3] .............................................. C10M 1/32

[52] U.S. Cl. .............................. 252/51.5 A; 252/47.5; 252/49.9; 252/46.6; 252/46.7

[58] Field of Search ................. 252/51.5 A, 47.5, 49.9

[56] References Cited

U.S. PATENT DOCUMENTS 3,219,666 11/1965 Norman et al. ............ 252/51.5 A X
3,950,341 4/1976 Okamoto et al. .......... 252/51.5 A X
3,991,056 11/1976 Okamoto et al. .......... 252/51.5 A X
3,991,098 11/1976 Okamoto .................... 252/51.5 A X
4,011,167 3/1977 Chibnik ...................... 252/51.5 A X

*Primary Examiner*—Paul F. Shaver
*Attorney, Agent, or Firm*—Daniel N. Hall; William H. Pittman; Raymond F. Keller

[57] ABSTRACT

Carboxylic acid acylating agents are derived from polyalkenes such as polybutenes, and a dibasic, carboxylic reactant such as maleic or fumaric acid or certain derivatives thereof. These acylating agents are characterized in that the polyalkenes from which they are derived have a Mn value of about 1300 to about 5000 and a Mw/Mn value of about 1.5 to about 4. The acylating agents are further characterized by the presence within their structure of at least 1.3 groups derived from the dibasic, carboxylic reactant for each equivalent weight of the groups derived from the polyalkene. The acylating agents can be reacted with a further reactant subject to being acylated such as polyethylene polyamines and polyols (e.g., pentaerythritol) to produce derivatives useful per se as lubricant additives or as intermediates to be subjected to post-treatment with various other chemical compounds and compositions, such as epoxides, to produce still other derivatives useful as lubricant additives.

65 Claims, No Drawings

NOVEL CARBOXYLIC ACID ACYLATING AGENTS, DERIVATIVES THEREOF, CONCENTRATE AND LUBRICANT COMPOSITIONS CONTAINING THE SAME, AND PROCESSES FOR THEIR PREPARATION

REFERENCE TO RELATED APPLICATIONS

This application is a continuation-in-part of U.S. Ser. No. 772,161, filed Feb. 25, 1977, now abandoned.

This invention is concerned with novel chemical processes and compositions. In particular, this invention relates to certain substituted succinic acylating agents; processes for preparing substituted acylating compositions and the acylating compositions thus prepared; lubricating compositions comprising such substituted succinic acylating agents and such substituted acylating compositions; processes for preparing certain carboxylic derivative compositions from such substituted acylating agents and such substituted acylating compositions; lubricant compositions comprising a major amount of oil of lubricating viscosity and a minor amount of one or more such carboxylic derivative compositions; processes for preparing post-treated carboxylic acid derivative compositions and the post-treated carboxylic acid derivative compositions thus produced; lubricating compositions comprising a major amount of oil of lubricating viscosity and a minor amount of at least one such post-treated carboxylic acid derivative composition; and concentrates comprising a major amount of a normally liquid, substantially inert organic solvent/diluent and from about 10% to about 80% by weight of one or more of the afore-mentioned substituted succinic acylating agents and compositions.

From one viewpoint, this invention can be regarded as an improvement in the known field of lubricant additive technology which has developed since the 1950's around high molecular weight carboxylic acid acylating agents and various acylated derivatives thereof. Thus, for example, the patent literature discloses the preparation of high molecular weight carboxylic acylating agents by reacting an olefin (e.g., a polyalkene such as polybutene) or a derivative thereof, usually containing at least about 50 aliphatic carbon atoms, with an unsaturated carboxylic acid or derivative thereof. Typical unsaturated carboxylic acid derivatives include acrylic acid, methylacrylate, maleic acid, fumaric acid, and maleic anhydride. Exemplary of the patent literature are the following U.S., British and Canadian patents; U.S. Pat. Nos. 3,024,237; 3,087,936; 3,172,892; 3,215,707; 3,219,666; 3,231,587; 3,245,910; 3,272,746; 3,288,714; 3,312,619; 3,341,542; 3,367,943; 3,381,022; 3,454,607; 3,470,098; 3,630,902; 3,652,616; 3,755,169; 3,868,330; 3,912,764; U.K. Pat. Nos. 944,136; 1,085,903; 1,162,436; 1,440,219; and Canadian Pat. No. 956,397. These same patents also establish that various derivatives of these high molecular weight carboxylic acid acylating agents are known to be useful as additives in fuel and lubricant compositions, especially as dispersant/detergent additives which function to promote engine cleanliness, neutralize acidic by-products of combustion, and the like. Some of the compositions disclosed in the above patents are presently used in substantial amounts as commercial lubricant additives.

This invention is based on the discovery that a novel class of high molecular weight carboxylic acid acylating agents is capable of imparting unique and beneficial properties to lubricant additives prepared therefrom and lubricating compositions containing such additives while, at the same time, retaining the desirable properties of similar lubricant additives and lubricating compositions prepared from other high molecular weight carboxylic acid acylating agents of the prior art. In addition, the retained desirable properties are themselves not only retained as such but often enhanced or improved. For example, if the similar lubricant additives prepared from high molecular weight carboxylic acylating agents of the prior art are known to function as ashless dispersants in lubricant compositions, the corresponding additive prepared from the novel high molecular weight carboxylic acid compositions often exhibit improved ashless dispersant properties.

The novel class of high molecular weight carboxylic acid acylating agents of this invention and derivatives thereof, especially the latter, impart significant fluidity modifying properties to lubricant compositions sufficient to permit elimination of all or a significant amount of viscosity index improver from multigrade lubricant compositions containing the same; for example, a 10W-30 crankcase engine oil.

Fluidity modifying lubricant additives, particularly viscosity index improvers (sometimes referred to hereafter as "V.I. improver(s)"), which are completely hydrocarbon in character, such as polybutenes having average molecular weights of 60,000–80,000 or more and hydrogenated butadienestyrene copolymers having average molecular weights of 20,000–200,000, exhibit no dispersant or detergent properties. That is, they are monofunctional additives imparting to the lubricant only the desired V.I. improving properties. To obtain dispersant or detergent properties, such hydrocarbon viscosity index improvers are used in combination with one or more dispersant or detergent additives as illustrated by U.S. Pat. Nos. 3,554,911 and 3,761,404.

In general, two approaches have been used to prepare multifunctional lubricant additives which exhibit both (a) fluidity modifying properties, especially V.I. improving properties, and (b) dispersant and/or detergent properties. One approach involves "suspending" from or "incorporating" into the hydrocarbon backbone of a high molecular weight polymer certain polar groups (usually carboxylic acid derivatives such as amides and esters). The high molecular weight material thus produced continues to exhibit V.I. improving properties attributable to its high molecular weight hydrocarbon backbone and dispersant or detergent properties attributable to the polar groups. This approach is illustrated by U.S. Pat. Nos. 3,702,300 and 3,933,761. For lack of a better art-recognized descriptive term, the polymers made pursuant to this approach are sometimes referred to herein as "dispersant V.I. improver(s)."

The second general approach for preparing multifunctional lubricant additives involves modifying a dispersant/detergent additive so as to incorporate into the dispersant/detergent additive fluidity modifying properties, especially V.I. improving properties. This approach is illustrated by U.S. Pat. No. 3,219,666. The U.S. Pat. No. 3,219,666 is primarily concerned with acylated nitrogen derivatives of high molecular weight succinic acid acylating agents which derivatives function as dispersant additives in lubricant compositions. The acylating agents from which the dispersants are prepared are substituted succinic acylating agents preferably having a substituent derived from a polyolefin having a molecular weight of about 750–5000. However, the patent further teaches that, if V.I. improving properties are desired in addition to the dispersant properties, the substituent should be derived from higher molecular weight olefin polymers having molecular weights from about 10,000 to about 100,000 or higher. Again, for lack of a better art-recognized descriptive term, such multifunctional lubricant additives made pursuant to this approach (that is, incorporating a very high molecular weight hydrocarbon substituent into a dispersant) are referred to herein as "V.I. improving dispersant(s)", "V.I. improving detergents", and/or "V.I. improving dispersants/detergents".

A third approach for preparing lubricant additives having both detergency and viscosity index-improving properties is described in U.S. Pat. No. 3,630,902. This approach involves reacting a high molecular weight succinimide with a polymerizable acid to form a polymerizable acyl derivative of the succinimide. The polymerizable derivative is then polymerized to produce the desired multifunctional lubricant additive.

The novel class of carboxylic acid acylating agents of this invention and the derivatives produced therefrom represent a further distinct and hitherto unrecognized approach for preparing multifunctional lubricating additives.

Accordingly, it is a principal object of this invention to provide a novel class of substituted succinic acylating agents.

Another object is to provide a process for preparing a novel class of substituted acylating compositions from polyalkenes, maleic and/or fumaric acid or derivatives thereof, and chlorine, as well as to provide the novel substituted acylating compositions thus produced.

A further object is to provide lubricant compositions and concentrates containing said novel substituted succinic acylating agents and said novel substituted acylating compositions.

A still further object is to provide a process for preparing carboxylic acid derivatives from said novel substituted succinic acylating agents and said novel substituted acylating compositions as well as lubricant compositions and concentrates containing said carboxylic acid derivatives.

An additional object is to provide a process for post-treating said carboxylic acid derivatives and the post-treated carboxylic acid compositions thus produced as well as lubricant compositions and concentrates containing such post-treated carboxylic acid derivatives.

The manner in which these and other objects can be achieved will be apparent from the following detailed description of the invention.

In one aspect of this invention, one or more of the above objectives can be achieved by providing substituted succinic acylating agents consisting of substituent groups and succinic groups, wherein the substituent groups are derived from polyalkene, said polyalkene being characterized by a Mn value of 1300 to about 5000 and a Mw/Mn value of about 1.5 to about 4, said acylating agent being characterized by the presence within its structure of an average of at least 1.3 succinic groups for each equivalent weight of substituent group.

In another aspect, one or more objects of this invention can be achieved by providing a process for preparing substituted acylating compositions comprising heating at a temperature of at least about 140° C.:

(A) Polyalkene characterized by a Mn value of 1300 to about 5000 and a Mw/Mn value of about 1.5 to about 4, (B) One or more acidic reactants of the formula

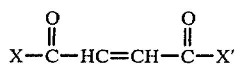

$$X-\overset{O}{\overset{\|}{C}}-HC=CH-\overset{O}{\overset{\|}{C}}-X'$$

wherein X and X' are each as defined hereinafter with respect to Formula I, (C) Chlorine, wherein the mole ratio of (A):(B) is such that there is at least 1.3 moles of (B) for each mole of (A) where the number of moles of (A) is the quotient of the total weight of (A) divided by the value of Mn, and the amount of chlorine employed is such as to provide at least about 0.2 mole of chlorine for each mole of (B) to be reacted with (A), said substituted acylating compositions being characterized by the presence within their structure of an average of at least 1.3 groups derived from (B) for each equivalent weight of the substituent groups derived from (A); and, in a further aspect, one or more objects of this invention are achieved by providing substituted acylating compositions produced by such a process.

One or more objects of the invention are achieved by providing a process for preparing carboxylic derivative compositions comprising reacting one or more substituted succinic acylating agents or substituted acylating compositions, as referred to hereinbefore and described in more detail hereafter, with a reactant selected from the group consisting of (a) amine characterized by the presence within its structure of at least one H–N< group, (b) alcohol, (c) reactive metal or reactive metal compound, and (d) a combination of two or more of any of (a) through (c), the components of (d) being reacted with said acylating agent simultaneously or sequentially in any order; in addition, one or more additional objects of the invention are accomplished by providing carboxylic acid derivative compositions produced by such a process.

One or more objects of this invention are achieved by providing a process for preparing post-treated carboxylic acid derivative compositions comprising reacting one or more carboxylic acid derivative compositions as mentioned hereinabove and described in more detail hereafter, wherein said reactant is (a) with one or more post-treated reagents selected from the group consisting of boron oxide, boron oxide hydrate, boron halides, boron acids, esters of boron acids, carbon disulfide, $H_2S$ sulfur, sulfur chloride, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde producing compounds plus phenols, and sulfur plus phenols; further, one or more additional objects of this invention are accomplished by providing the post-treated carboxylic acid derivative compositions produced by such a process.

One or more additional objects of this invention are achieved by providing a process for preparing post-treated carboxylic acid derivative compositions comprising reacting one or more carboxylic acid derivative compositions mentioned hereinabove and described in more detail hereinafter wherein said reactant is (b) with one or more post-treating reagents selected from the group consisting of boron oxide, boron oxide hydrates, boron halides, boron acids, esters of boron acids, sulfur, sulfur chlorides, phosphorus sulfides, phosphorus oxides, carboxylic acid acylating agents, epoxides, and episulfides; in addition one or more further objects can be achieved by providing the post-treated carboxylic acid derivative compositions produced by such a process.

One or more additional objects of this invention are achieved by providing a process for preparing post-treated carboxylic acid derivative compositions comprising reacting one or more carboxylic acid derivative compositions as referred to hereinabove and described in more detail hereinafter, wherein said reactant is a combination of (a) and (b), with one or more post-treating reagents selected from the group consisting of boron oxide, boron oxide hydrate, boron halides, boron acids, esters of boron acids, carbon disulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols; one or more additional objects are achieved by providing post-treated carboxylic acid derivatives compositions produced by such a process.

One or more objects of the invention are also achieved by providing lubricating compositions comprising a major amount of lubricating oil of lubricating viscosity and a minor amount of at least one substituted succinic acylating agent, substituted acylating composition, carboxylic acid derivative composition, post-treated carboxylic acid derivative composition, as mentioned above and described in more detail hereinafter.

One or more additional objects of the invention can be achieved by providing concentrate compositions comprising from about 20 to about 90 percent by weight of a normally liquid, substantially inert, organic solvent/diluent and from about 10% to about 80% by weight of at least one substituted succinic acylating agent, substituted acylating composition, carboxylic acid derivative composition, post-treated carboxylic acid derivative composition, as mentioned hereinabove and described in more detail hereafter.

THE SUBSTITUTED SUCCINIC ACYLATING AGENT

The novel class of substituted succinic acylating agent of this invention are those which can be characterized by the presence within their structure of two groups or moieties. The first group or moiety is referred to herein, for convenience, as the "substituent group(s)" and is derived from a polyalkene. The polalkene from which the substituted groups are derived is characterized by a Mn (number average molecular weight) value of from 1300 to about 5000 and a Mw/Mn value of about 1.5 to about 4.

The second group or moiety is referred to herein as the "succinic group(s)". The succinic groups are those groups characterized by the structure

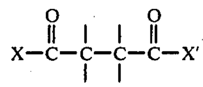

Formula I wherein X and X′ are the same or different provided at least one of X and X′ is such that the substituted succinic acylating agent can function as carboxylic acylating agents. That is, at least one of X and X′ must be such that the substituted acylating agent can esterify alcohols, form amides or amine salts with ammonia or amines, form metal salts with reactive metals or basically reacting metal compounds, and otherwise function as a conventional carboxylic acid acylating agents. Transesterification and transamidation reactions are considered, for purposes of this invention, as conventional acylating reactions.

Thus, X and/or X′ is usually —OH, —O—hydrocarbyl, $—O^-M^+$ where $M^+$ represents one equivalent of a metal, ammonium or amine cation, $—NH_2$, —Cl, —Br, and together, X and X′ can be —O— so as to form the anhydride. The specific identity of any X or X′ group which is not one of the above is not critical so long as its presence does not prevent the remaining group from entering into acylation reactions. Preferably, however, X and X′ are each such that both carboxyl functions of the succinic group (i.e., both $$-\overset{O}{\overset{\|}{C}}-X \text{ and } -\overset{O}{\overset{\|}{C}}-X')$$

can enter into acylation reactions.

One of the unsatisfied valences in the grouping

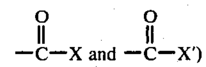

of Formula I forms a carbon-to-carbon bond with a carbon atom in the substituent group. While other such unsatisfied valence may be satisfied by a similar bond with the same or different substituent group, all but the said one such valence is usually satisfied by hydrogen; i.e., —H.

The substituted succinic acylating agents are characterized by the presence within their structure of at least 1.3 succinic groups (that is, groups corresponding to Formula I) for each equivalent weight of substituent groups. For purposes of this invention, the number of equivalent weights of substituent groups is deemed to be the number corresponding to the quotient obtained by dividing the Mn value of the polyalkene from which the substituent is derived into the total weight of the substituent groups present in the substituted succinic acylating agents. Thus, if a substituted succinic acylating agent is characterized by a total weight of substituent group of 40,000 and the Mn value for the polyalkene from which the substituent groups are derived is 2000, then that substituted succinic acylating agent is characterized by a total of 20 (40,000/2000=20) equivalent weights of substituent groups. Therefore, that particular succinic acylating agent must also be characterized by the presence within its structure of at least 26 succinic groups to meet one of the requirements of the novel succinic acylating agents of this invention.

Another requirement for the substituted succinic acylating agents within this invention is that the substituent groups must have been derived from a polyalkene characterized by a Mw/Mn value of about 1.5 to about 4, Mw being the conventional symbol representing weight average molecular weight.

Before proceeding, it should be pointed out that the Mn and Mw values for polyalkene, for purposes of this invention, are determined by gel permeation chromatography (GPC). This separation method involves column chromatography in which the stationary phase is a heteroporous, solvent-swollen polymer network of a polystyrene gel varying in permeability over many orders of magnitude. As the liquid phase (tetrahydrofuran) containing the polymer sample passes through the gel, the polymer molecules diffuse into all parts of the gel not mechanically barred to them. The smaller molecules "permeate" more completely and spend more time in the column; the larger molecules "permeate" less and pass through the column more rapidly. The Mn and Mw values of the polyalkenes of this invention can be obtained by one of ordinary skill in the art by the comparison of the distribution data obtained to a series of calibration standards of polymers of known molecular weight distribution. For purposes of this invention a series of fractionated polymers of isobutene, polyisobutene being the preferred embodiment, is used as the calibration standard.

For example, the Mw values disclosed herein are obtained using a Waters Associates model 200 gel permeation chromatograph equipped with a 2.5 ml syphon, a 2 ml sample injection loop and four stainless steel columns 7.8 mm in diameter by 120 centimeters long. Each column was packed with μ STYROGEL, a commercially available, rigid, porous gel (in particle form) of crosslinked styrene/divinyl benzene copolymers. These gels are also obtained from Waters Associates. The first column contains μ STYROGEL having a retention volume of $10^3$ A. The second and third columns contain STYROGEL having a retention size of 500 A. The fourth column contains STYROGEL having a retention volume of 60 A. The first column is connected to the sample loop with stainless steel tubing, 83.3 cm long. The first column is connected to the second with a 2.3 cm length of the stainless steel tubing. The second and third columns are each connected by 10.2 cm lengths of tubing. The fourth column is connected to the detector by a 25.4 cm length of tubing. All the connecting tubing is 1.6 mm in diameter.

Calibration standards were prepared by dialyzing a polyisobutylene sample having a specific gravity at 60° F. (15.5° C.) of 0.89 and a viscosity at 210° F. (99° C.) of 12.50 SUS. A sample of this polymer is fractionated by dialysis using a rubber membrane and a soxhlet extraction apparatus with refluxing petroleum ether as solvents. Eleven fractions were taken; one sample each hour for the first seven hours, then three samples each four hours, and finally the residue which did not permeate the membrane over a four-hour period and the Mn of each was measured using vapor phase osmometry and benzene solvent.

Each calibration sample is then chromatographed. Approximately 7 mg of sample is weighed into a small bottle which is then filled with 4 ml of reagent grade tetrahydrofuran. The sealed bottle is stored overnight before analysis. The afore-described liquid phase chromatograph is degassed at 59° C. and a flow rate of 2.0 ml per minute of tetrahydrofuran maintained. Sample pressure is 180 psi and the reference pressure 175 psi. The retention time of each sample is measured. The Mw of each calibration sample is calculated from the Mn assuming the relationship 2 Mn=Mw. The retention times and Mw for each sample, which are shown in the following table, were plotted to provide a standardization curve. The Mn and Mw for sample polymers is then obtained using this curve and the methods described in "Topics in Chemical Instrumentation, Volumne XXIX, Gel Permeation Chromatography" by Jack Cages, published in The Journal of Chemical Education, Volume 43, numbers 7 and 8, (1966).

Polyalkenes having the Mn and Mw values discussed above are known in the art and can be prepared according to conventional procedures. Several such polyalkenes, especially polybutenes, are commercially available.

TABLE

| Rt* | Mw | Rt* | Mw | Rt* | Mw |
|---|---|---|---|---|---|
| 30 | 42240 | 40 | 638 | 50 | 229 |
| 31 | 26400 | 41 | 539 | 51 | 216 |
| 32 | 16985 | 42 | 453 | 52 | 202 |
| 33 | 10780 | 43 | 400 | 53 | 189 |
| 34 | 6710 | 44 | 361 | 54 | 178 |
| 35 | 4180 | 45 | 330 | 55 | 167 |
| 36 | 2640 | 46 | 304 | 56 | 156 |
| 37 | 1756 | 47 | 282 | | |
| 38 | 1200 | 48 | 264 | | |
| 39 | 865 | 49 | 246 | | |

*Rt = retention time in units of number of times syphan (2.5ml) empties. The syphan empties every 2.5 minutes.

Again, turning to the characteristics of the succinic acylating agents of this invention, the succinic groups will normally correspond to the formula

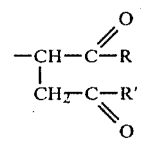

Formula II wherein R and R' are each independently selected from the group consisting of —OH, —Cl, —O—lower alkyl, and when taken together, R and R' are —O—. In the latter case, the succinic group is a succinic anhydride group. All the succinic groups in a particular succinic acylating agent need not be the same, but they can be the same. Preferably, the succinic groups will correspond to

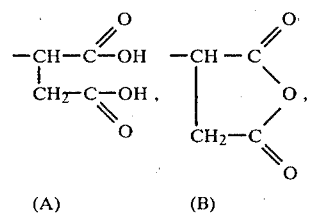

Formula III and mixtures of III(A) and III(B). Providing substituted succinic acylating agents wherein the succinic groups are the same or different is within the ordinary skill of the art and can be accomplished through conventional procedures such as treating the substituted succinic acylating agents themselves (for example, hydrolyzing the anhydride to the free acid or converting the free acid to an acid chloride with thionyl chloride) and/or selecting the appropriate maleic or fumaric reactants.

As previously mentioned, the minimum number of succinic groups for each equivalent weight of substituent group is 1.3. Preferably, however, the minimum will be 1.4; usually 1.4 to about 3.5 succinic groups for each equivalent weight of substituent group. An especially preferred minimum is at least 1.5 succinic groups for each equivalent weight of substituent group. A preferred range based on this minimum is at least 1.5 to about 2.5 succinic groups per equivalent weight of substituent groups.

From the foregoing, it is clear that the substituted succinic acylating agents of this invention can be represented by the symbol $$R_1(R_2)_y$$

wherein $R_1$ represents one equivalent weight of substituent group, $R_2$ represents one succinic group corresponding to Formula I, Formula II, or Formula III, as discussed above, and y is a number equal to or greater than 1.3; i.e., $\geqq 1.3$. The more preferred embodiments of the invention could be similarly represented by, for example, letting $R_1$ and $R_2$ represent more preferred substituent groups and succinic groups, respectively, as discussed elsewhere herein and by letting the value of y vary as discussed above; e.g., Y is equal to or greater than 1.4 ($y \geqq 1.4$); Y is equal to or greater than 1.5 ($y \geqq 1.5$); Y equals 1.4 to about 3.5 ($y=1.4$–$3.5$); and Y equals 1.5 to about 3.5 ($y=1.5$–$3.5$).

In addition to preferred substituted succinic groups where the preference depends on the number and identity of succinic groups for each equivalent weight of substituent groups, still further preferences are based on the identity and characterization of the polyalkenes from which the substituent groups are derived.

With respect to the value of Mn, for example, a minimum of about 1500 is preferred with an Mn value in the range of from about 1500 to about 3200 also being preferred. A more preferred Mn value is one in the range of from about 1500 to about 2800. A most preferred range of Mn values is from about 1500 to about 2400. With polybutenes, an especially preferred minimum value for Mn is about 1700 and an especially preferred range of Mn values is from about 1700 to about 2400.

As to the values of the ratio Mw/Mn, there are also several preferred values. A minimum Mw/Mn value of about 1.8 is preferred with a range of values of about 1.8 up to about 3.6 also being preferred. A still more preferred minimum value of Mw/Mn is about 2.0 with a preferred range of values of from about 2.0 to about 3.4 also being a preferred range. An especially preferred minimum value of Mw/Mn is about 2.5 with a range of values of about 2.5 to about 3.2 also being especially preferred.

Before proceeding to a further discussion of the polyalkenes from which the substituent groups are derived, it should be pointed out that these preferred characteristics of the succinic acylating agents are, for lack of better terminology to describe the situation contemplated by this invention, intended to be understood as being both independent and dependent. They are intended to be independent in the sense that, for example, a preference for a minimum of 1.4 or 1.5 succinic groups per equivalent weight of substituent groups is not tied to a more preferred value of Mn or Mw/Mn. They are intended to be dependent in the sense that, for example, when a preference for a minimum of 1.4 or 1.5 succinic groups is combined with more preferred values of Mn and/or Mw/Mn, the combination of preferences does in fact describe still further more preferred embodiments of the invention. Thus, the various parameters are intended to stand alone with respect to the particular parameter being discussed but can also be combined with other parameters to identify further preferences. This same concept is intended to apply throughout the specification with respect to the description of preferred values, ranges, ratios, reactants, and the like unless a contrary intent is clearly demonstrated or apparent.

The polyalkenes from which the substituent groups are derived are homopolymers and interpolymers of polymerizable olefin monomers of 2 to about 16 carbon atoms; usually 2 to about 6 carbon atoms. The interpolymers are those in which two or more olefin monomers are interpolymerized according to well-known conventional procedures to form polyalkenes having units within their structure derived from each of said two or more olefin monomers. Thus, "interpolymer(s)" as used herein is inclusive of copolymers, terpolymers, tetrapolymers, and the like. As will be apparent to those of ordinary skill in the art, the polyalkenes from which the substituent groups are derived are often conventionally referred to as "polyolefin(s)".

The olefin monomers from which the polyalkenes are derived are polymerizable olefin monomers characterized by the presence of one or more ethylenically unsaturated groups (i.e., $>C=C<$); that is, they are monoolefinic monomers such as ethylene, propylene, butene-1, isobutene, and octene-1 or polyolefinic monomers (usually diolefinic monomers) such as butadiene-1,3 and isoprene.

These olefin monomers are usually polymerizable terminal olefins; that is, olefins characterized by the presence in their structure of the group $>C=CH_2$. However, polymerizable internal olefin monomers (sometimes referred to in the patent literature as medial olefins) characterized by the presence within their structure of the group

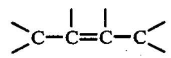

can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, pentadiene-1,3 (i.e., piperylene) is deemed to be a terminal olefin for purposes of this invention.

While the polyalkenes from which the substituent groups of the succinic acylating agents are derived generally are hydrocarbon polyalkenes, they can contain non-hydrocarbon groups such as lower alkoxy, lower alkyl mercapto, hydroxy, mercapto, oxo (i.e., $$\overset{O}{\parallel}$$

as in keto and aldehydo groups; e.g.,

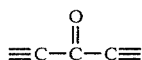

and

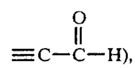

nitro, halo, cyano, carboalkoxy (i.e.,

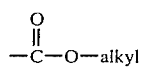

where "alkyl" is usually lower alkyl) alkanoyloxy (i.e., alkyl $$-\overset{\overset{\large O}{\|}}{C}-O-$$

where alkyl is usually lower alkyl, and the like provided the non-hydrocarbon substituents do not substantially interfere with formation of the substituted succinic acid acylating agents of this invention. When present, such non-hydrocarbon groups normally will not contribute more than about 10% by weight of the total weight of the polyalkenes. Since the polyalkene can contain such non-hydrocarbon substituent, it is apparent that the olefin monomers from which the polyalkenes are made can also contain such substituents. Normally, however, as a matter of practicality and expense, the olefin monomers and the polyalkenes will be free from non-hydrocarbon groups, except chloro groups which usually facilitate the formation of the substituted succinic acylating agents of this invention. (As used herein, the term "lower" when used with a chemical group such as in "lower alkyl" or "lower alkoxy" is intended to describe groups having up to seven carbon atoms.)

Although the polyalkenes may include aromatic groups (especially phenyl groups and lower alkyl- and/or lower alkoxy-substituted phenyl groups such as para-(tert-butyl)phenyl) and cycloaliphatic groups such as would be obtained from polymerizable cyclic olefins or cycloaliphatic substituted-polymerizable acyclic olefins, the polyalkenes usually will be free from such groups. Nevertheless, polyalkenes derived from interpolymers of both 1,3-dienes and styrenes such as butadiene-1,3 and styrene or para-(tert-butyl)styrene are exceptions to this generalization. Again, because aromatic and cycloaliphatic groups can be present, the olefin monomers from which the polyalkenes are prepared can contain aromatic and cycloaliphatic groups.

From what has been described hereinabove in regard to the polyalkene, it is clear that there is a general preference for aliphatic, hydrocarbon polyalkenes free from aromatic and cycloaliphatic groups (other than the dienestyrene interpolymer exception already noted). Within this general preference, there is a further preference for polyalkenes which are derived from the group consisting of homopolymers and interpolymers of terminal hydrocarbon olefins of 2 to about 16 carbon atoms. This further preference is qualified by the proviso that, while interpolymers of terminal olefins are usually preferred, interpolymers optionally containing up to about 40% of polymer units derived from internal olefins of up to about 16 carbon atoms are also within a preferred group. A more preferred class of polyalkenes are those selected from the group consisting of homopolymers and interpolymers of terminal olefins of 2 to about 6 carbon atoms, more preferably 2 to 4 carbon atoms. However, another preferred class of polyalkenes are the latter more preferred polyalkenes optionally containing up to about 25% of polymer units derived from internal olefins of up to about 6 carbon atoms.

Specific examples of terminal and internal olefin monomers which can be used to prepare the polyalkenes according to conventional, well-known polymerization techniques include ethylene; propylene; butene-1; butene-2; isobutene; pentene-1; hexene-1; heptene-1; octene-1; nonene-1; decene-1; pentene-2; propylene-tetramer; diisobutylene; isobutylene trimer; butadiene-1,2; butadiene-1,3; pentadiene-1,2; pentadiene-1,3; pentadiene-1,4; isoprene; hexadiene-1,5; 2-chloro-butadiene-1,3; 2-methyl-heptene-1; 3-cyclohexylbutene-1; 2-methyl-5-propyl-hexene-1; pentene-3; octene-4; 3,3-dimethyl-pentene-1; styrene; 2,4-dichloro styrene; divinylbenzene; vinyl acetate; allyl alcohol; 1-methyl-vinyl acetate; acrylonitrile; ethyl acrylate; methyl methacrylate; ethyl vinyl ether; and methyl vinyl ketone. Of these, the hydrocarbon polymerizable monomers are preferred and of these hydrocarbon monomers, the terminal olefin monomers are particularly preferred.

Specific examples of polyalkenes include polypropylenes, polybutenes, ethylene-propylene copolymers, styrene-isobutene copolymers, isobutene-butadiene-1,3 copolymers, propene-isoprene copolymers, isobutene-chloroprene copolymers, isobutene-(para-methyl)styrene copolymers, copolymers of hexene-1 with hexadiene-1,3, copolymers of octene-1 with hexene-1, copolymers of heptene-1 with pentene-1, copolymers of 3-methyl-butene-1 with octene-1, copolymers of 3,3-dimethyl-pentene-1 with hexene-1, and terpolymers of isobutene, styrene and piperylene. More specific examples of such interpolymers include copolymer of 95% (by weight) of isobutene with 5% (by weight) of styrene; terpolymer of 98% of isobutene with 1% of piperylene and 1% of chloroprene; terpolymer of 95% of isobutene with 2% of butene-1 and 3% of hexene-1; terpolymer of 60% of isobutene with 20% of pentene-1 and 20% of octene-1; copolymer of 80% of hexene-1 and 20% of heptene-1; terpolymer of 90% of isobutene with 2% of cyclohexene and 8% of propylene; and copolymer of 80% of ethylene and 20% of propylene. A preferred source of polyalkenes are the poly(isobutene)s obtained by polymerization of $C_4$ refinery stream having a butene content of about 35 to about 75 percent by weight and an isobutene content of about 30 to about 60 percent by weight in the presence of a Lewis acid catalyst such as aluminum trichloride or boron trifluoride. These polybutenes contain predominantly (greater than about 80% of the total repeating units) of isobutene repeating units of the configuration

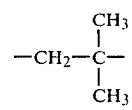

Obviously, preparing polyalkenes as described above which meet the various criteria for Mn and Mw/Mn is within the skill of the art and does not comprise part of the present invention. Techniques readily apparent to those in the art include controlling polymerization temperatures, regulating the amount and type of polymerization initiator and/or catalyst, employing chain terminating groups in the polymerization procedure, and the like. Other conventional techniques such as stripping (including vacuum stripping) a very light end and/or oxidatively or mechically degrading high molecular weight polyalkene to produce lower molecular weight polyalkenes can also be used.

In preparing the substituted succinic acylating agents of this invention, one or more of the above-described polyalkenes is reacted with one or more acidic reactants selected from the group consisting of maleic or fumaric reactants of the general formula $$X-\overset{O}{\overset{\|}{C}}-CH=CH-\overset{O}{\overset{\|}{C}}-X' \quad \text{Formula IV}$$

wherein X and X' are as defined hereinbefore. Preferably the maleic and fumaric reactants will be one or more compounds corresponding to the formula $$R-\overset{O}{\overset{\|}{C}}-CH=CH-\overset{O}{\overset{\|}{C}}-R' \quad \text{Formula V}$$

wherein R and R' are as previously defined herein. Ordinarily the maleic or fumaric reactants will be maleic acid, fumaric acid, maleic anhydride, or a mixture of two or more of these. The maleic reactants are usually preferred over the fumaric reactants because the former are more readily available and are, in general, more readily reacted with the polyalkenes (or derivatives thereof) to prepare the substituted succinic acylating agents of the present invention. The especially preferred reactants are maleic acid, maleic anhydride, and mixtures of these. Due to availability and ease of reaction, maleic anhydride will usually be employed.

The one or more polyalkenes and one or more maleic or fumaric reactants can be reacted according to any of several known procedures in order to produce the substituted succinic acylating agents of the present invention. Basically, the procedures are analogous to procedures used to prepare the high molecular weight succinic anhydrides and other equivalent succinic acylating analogs thereof except that the polyalkenes (or polyolefins) of the prior art are replaced with the particular polyalkenes described above and the amount of maleic or fumaric reactant used must be such that there is at least 1.3 succinic groups for each equivalent weight of the substituent group in the final substituted succinic acylating agent produced.

For convenience and brevity, the term "maleic reactant" is often used hereafter. When used, it should be understood that the term is generic to acidic reactants selected from maleic and fumaric reactants corresponding to Formulas IV and V above including a mixture of such reactants.

One procedure for preparing the substituted succinic acylating agents of this invention is illustrated, in part, in U.S. Pat. No. 3,219,666 which is expressly incorporated herein by reference for its teachings in regard to preparing succinic acylating agents. This procedure is conveniently designated as the "two-step procedure." It involves first chlorinating the polyalkene until there is an average of at least about one chloro group for each molecular weight of polyalkene. (For purposes of this invention, the molecular weight of the polyalkene is the weight corresponding to the Mn value.) Chlorination involves merely contacting the polyalkene with chlorine gas until the desired amount of chlorine is incorporated into the chlorinated polyalkene. Chlorination is generally carried out at a temperature of about 75° C. to about 125° C. If a diluent is used in the chlorination procedure, it should be one which is not itself readily subject to further chlorination. Poly- and perchlorinated and/or fluorinated alkanes and benzenes are examples of suitable diluents.

The second step in the two-step chlorination procedure, for purposes of this invention, is to react the chlorinated polyalkene with the maleic reactant at a temperature usually within the range of about 100° C. to about 200° C. The mole ratio of chlorinated polyalkene to maleic reactant is usually about 1:1. (For purposes of this invention, a mole of chlorinated polyalkene is that weight of chlorinated polyalkene corresponding to the Mn value of the unchlorinated polyalkene.) However, a stoichiometric excess of maleic reactant can be used, for example, a mole ratio of 1:2. If an average of more than about one chloro group per molecule of polyalkene is introduced during the chlorination step, then more than one mole of maleic reactant can react per molecule of chlorinated polyalkene. Because of such situations, it is better to describe the ratio of chlorinated polyalkene to maleic reactant in terms of equivalents. (An equivalent weight of chlorinated polyalkene, for purposes of this invention, is the weight corresponding to the Mn value divided by the average number of chloro groups per molecule of chlorinated polyalkene while the equivalent weight of a maleic reactant is its molecular weight.) Thus, the ratio of chlorinated polyalkene to maleic reactant will normally be such as to provide about one equivalent of maleic reactant for each mole of chlorinated polyalkene up to about one equivalent of maleic reactant for each equivalent of chlorinated polyalkene with the understanding that it is normally desirable to provide an excess of maleic reactant; for example, an excess of about 5% to about 25% by weight. Unreacted excess maleic reactant may be stripped from the reaction product, usually under vacuum, or reacted during a further stage of the process as explained below.

The resulting polyalkenyl-substituted succinic acylating agent is, optionally, again chlorinated if the desired number of succinic groups are not present in the product. If there is present, at the time of this subsequent chlorination, any excess maleic reactant from the second step, the excess will react as additional chlorine is introduced during the subsequent chlorination. Otherwise, additional maleic reactant is introduced during and/or subsequent to the additional chlorination step. This technique can be repeated until the total number of succinic groups per equivalent weight of substituent groups reaches the desired level.

Another procedure for preparing substituted succinic acid acylating agents of the invention utilizes a process described in U.S. Pat. No. 3,912,764 and U.K. Pat. No. 1,440,219, both of which are expressly incorporated herein by reference for their teachings in regard to that process. According to that process, the polyalkene and the maleic reactant are first reacted by heating them together in a "direct alkylation" procedure. When the direct alkylation step is completed, chlorine is introduced into the reaction mixture to promote reaction of the remaining unreacted maleic reactants. According to the patents, 0.3 to 2 or more moles of maleic anhydride are used in the reaction for each mole of olefin polymer;

i.e., polyalkene. The direct alkylation step is conducted at temperatures of 180° C. to 250° C. During the chlorine-introducing stage, a temperature of 160° C. to 225° C. is employed. In utilizing this process to prepare the substituted succinic acylating agents of this invention, it would be necessary to use sufficient maleic reactant and chlorine to incorporate at least 1.3 succinic groups into the final product for each equivalent weight of polyalkene.

Other processes which can be used to prepare the substituted succinic acylating agents of this invention are disclosed in the following commonly assigned copending U.S. patent applications:

(1) Ser. No. 582,062 entitled AN IMPROVED PROCESS FOR MAKING SUCCINIC ACID ACYLATING AGENTS filed May 29, 1975, in the name of Jerome Martin Cohen (assignee docket number L-1519).

(2) Ser. No. 695,234 entitled TWO-STEP METHOD FOR THE PREPARATION OF SUBSTITUTED CARBOXYLIC ACIDS filed June 11, 1976, in the name of Jerome Martin Cohen (assignee docket number L-1504). Both (1) and (2) are expressly incorporated herein by reference for their teachings in regard to these processes.

The process presently deemed to be best for preparing the substituted succinic acylating agents of this invention from the standpoint of efficiency, overall economy, and the performance of the acylating agents thus produced, as well as the performance of the derivatives thereof, is the so-called "one-step" process. This process is described in U.S. Pat. Nos. 3,215,707 and 3,231,587. Both are expressly incorporated herein by reference for their teachings in regard to that process.

Basically, the one-step process involves preparing a mixture of the polyalkene and the maleic reactant containing the necessary amounts of both to provide the desired substituted succinic acylating agents of this invention. This means that there must be at least 1.3 moles of maleic reactant for each mole of polyalkene in order that there can be at least 1.3 succinic groups for each equivalent weight of substituent groups. Chlorine is then introduced into the mixture, usually by passing chlorine gas through the mixture with agitation, while maintaining a temperature of at least about 140° C.

A variation on this process involves adding additional maleic reactant during or subsequent to the chlorine introduction but, for reasons explained in U.S. Pat. Nos. 3,215,707 and 3,231,587, this variation is presently not as preferred as the situation where all the polyalkene and all the maleic reactant are first mixed before the introduction of chlorine.

Usually, where the polyalkene is sufficiently fluid at 140° C. and above, there is no need to utilize an additional substantially inert, normally liquid solvent/diluent in the one-step process. However, as explained hereinbefore, if a solvent/diluent is employed, it is preferably one that resists chlorination. Again, the poly- and per-chlorinated and/or -fluorinated alkanes, cycloalkanes, and benzenes can be used for this purpose.

Chlorine may be introduced continuously or intermittently during the one-step process. The rate of introduction of the chlorine is not critical although, for maximum utilization of the chlorine, the rate should be about the same as the rate of consumption of chlorine in the course of the reaction. When the introduction rate of chlorine exceeds the rate of consumption, chlorine is evolved from the reaction mixture. It is often advantageous to use a closed system, including superatmospheric pressure, in order to prevent loss of chlorine so as to maximize chlorine utilization.

The minimum temperature at which the reaction in the one-step process takes place at a reasonable rate is about 140° C. Thus, the minimum temperature at which the process is normally carried out is in the neighborhood of 140° C. The preferred temperature range is usually between about 160° C. and about 220° C. Higher temperatures such as 250° C. or even higher may be used but usually with little advantage. In fact, temperatures in excess of 220° C. are often disadvantageous with respect to preparing the particular acylated succinic compositions of this invention because they tend to "crack" the polyalkenes (that is, reduce their molecular weight by thermal degradation) and/or decompose the maleic reactant. For this reason, maximum temperatures of about 200° to about 210° C. are normally not exceeded. The upper limit of the useful temperature in the one-step process is determined primarily by the decomposition point of the components in the reaction mixture including the reactants and the desired products. The decomposition point is that temperature at which there is sufficient decomposition of any reactant or product such as to interfere with the production of the desired products.

In the one-step process, the molar ratio of maleic reactant to chlorine is such that there is at least about one mole of chlorine for each mole of maleic reactant to be incorporated into the product. Moreover, for practical reasons, a slight excess, usually in the neighborhood of about 5% to about 30% by weight of chlorine, is utilized in order to offset any loss of chlorine from the reaction mixture. Larger amounts of excess chlorine may be used but do not appear to produce any beneficial results.

As mentioned previously, the molar ratio of polyalkene to maleic reactant is such that there is at least about 1.3 moles of maleic reactant for each mole of polyalkene. This is necessary in order that there can be at least 1.3 succinic groups per equivalent weight of substituent group in the product. Preferably, however, an excess of maleic reactant is used. Thus, ordinarily about a 5% to about 25% excess of maleic reactant will be used relative to that amount necessary to provide the desired number of succinic groups in the product.

A preferred process for preparing the substituted acylating compositions of this invention comprises heating and contacting at a temperature of at least about 140° C. up to the decomposition temperature (A) Polyalkene characterized by Mn value of about 1300 to about 5000 and a Mw/Mn value of about 1.5 to about 4, (B) One or more acidic reactants of the formula

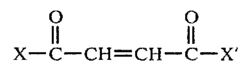

wherein X and X' are as defined hereinbefore, and (C) Chlorine wherein the mole ratio of (A):(B) is such that there is at least about 1.3 moles of (B) for each mole of (A) wherein the number of moles of (A) is the quotient of the total weight of (A) divided by the value of Mn and the amount of chlorine employed is such as to provide at least about 0.2 mole (preferably at least about 0.5 mole) of chlorine for each mole of (B) to be reacted with (A), said substituted acylating compositions being characterized by the presence within their structure of an average of at least 1.3 groups derived from (B) for each equivalent weight of the substituent groups derived from (A). The substituted acylated compositions as produced by such a process are, likewise, part of this invention.

As will be apparent, it is intended that the immediately preceding description of a preferred process be generic to both the process involving direct alkylation with subsequent chlorination as described in U.S. Pat. No. 3,912,764 and U.K. Pat. No. 1,440,219 and to the completely one-step process described in U.S. Pat. Nos. 3,215,707 and 3,231,587. Thus, said description does not require that the initial mixture of polyalkene and acidic reactant contain all of the acidic reactant ultimately to be incorporated into the substituted acylating composition to be prepared. In other words, all of the acidic reactant can be present initially or only part thereof with subsequent addition of acidic reactant during the course of the reaction. Likewise, a direct alkylation reaction can precede the introduction of chlorine. Normally, however, the original reaction mixture will contain the total amount of polyalkene and acidic reactant to be utilized. Furthermore, the amount of chlorine used will normally be such as to provide about one mole of chlorine for each unreacted mole of (B) present at the time chlorine introduction is commenced. Thus, if the mole ratio of (A):(B) is such that there is about 1.5 moles of (B) for each mole of (A) and if direct alkylation results in half of (B) being incorporated into the product, then the amount of chlorine introduced to complete reaction will be based on the unreacted 0.75 mole of (B); that is, at least about 0.75 mole of chlorine (or an excess as explained above) will then be introduced.

In a more preferred process for preparing the substituted acylating compositions of this invention, there is heated at a temperature of at least about 140° C. a mixture comprising:

(A) Polyalkene characterized by a Mn value of about 1300 to about 5000 and a Mw/Mn value of about 1.3 to about 4, (B) One or more acidic reactants of the formula

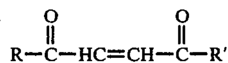

wherein R and R' are as defined above, and (C) Chlorine, wherein the mole ratio of (A):(B) is such that there is at least about 1.3 moles of (B) for each mole of (A) where the number of moles of (A) is a quotient of the total weight of (A) divided by the value of Mn, and the amount of chlorine employed is such as to provide at least about one mole of chlorine for each mole of (B) reacted with (A), the substituted acylating compositions being further characterized by the presence within their structure of at least 1.3 groups derived from (B) for each equivalent weight of the substituent groups derived from (A). This process, as described, includes only the one-step process; that is, a process where all of both (A) and (B) are present in the initial reaction mixture. The substituted acylated composition as produced by such a process are, likewise, part of this invention.

This is an appropriate point to comment upon the use of the terminology "substituted succinic acylating agent(s)" and "substituted acylating composition" as used herein. The former terminology is used in describing the substituted succinic acylating agents regardless of the process by which they are produced. Obviously, as discussed in more detail hereinbefore, several processes are available for producing the substituted succinic acylating agents. On the other hand, the latter terminology; that is, "substituted acylating composition(s)", is used to describe the reaction mixtures produced by the specific preferred processes described in detail herein. Thus, the identity of particular substituted acylating compositions is dependent upon a particular process of manufacture. It is believed that the novel acylating agents of this invention can best be described and claimed in the alternative manner inherent in the use of this terminology as thus explained. This is particularly true because, while the products of this invention are clearly substituted succinic acylating agents as defined and discussed above, their structure cannot be represented by a single specific chemical formula. In fact, mixtures of products are inherently present.

With respect to the preferred processes described above, preferences indicated hereinbefore with respect to (a) the substituted succinic acylating agents and (b) the values of Mn, the values of the ratio Mw/Mn, the identity and composition of the polyalkenes, the identity of the acidic reactant (that is, the maleic and/or fumaric reactants), the ratios of reactants, and the reaction temperatures also apply. In like manner, the same preferences apply to the substituted acylated compositions produced by these preferred processes.

For example, such processes wherein the reaction temperature is from about 160° C. to about 220° C. are preferred. Likewise, the use of polyalkenes wherein the polyalkene is a homopolymer or interpolymer of terminal olefins of 2 to about 16 carbon atoms, with the proviso that said interpolymers can optionally contain up to about 40% of the polymer units derived from internal olefins of up to about sixteen carbon atoms, constitutes the preferred aspect of the process and compositions prepared by the process. In a more preferred aspect, polyalkenes for use in the process and in preparing the compositions of the process are the homopolymers and interpolymers of terminal olefins of 2 to 6 carbon atoms with the proviso that said interpolymers can optionally contain up to about 25% of polymer units derived from internal olefins of up to about 6 carbon atoms. Especially preferred polyalkenes are polybutenes, ethylene-propylene copolymers, polypropylenes with the polybutenes being particularly preferred.

In the same manner, the succinic group content of the substituted acylating compositions thus produced are preferably the same as that described in regard to the substituted succinic acylating agents. Thus, the substituted acylating compositions characterized by the presence within their structure of an average of at least 1.4 succinic groups derived from (B) for each equivalent weight of the substituent groups derived from (A) are preferred with those containing at least 1.4 up to about 3.5 succinic groups derived from (B) for each equivalent weight of substituent groups derived from (A) being still more preferred. In the same way, those substituted acylating compositions characterized by the presence within their structure of at least 1.5 succinic groups derived from (B) for each equivalent weight of substituent group derived from (A) are still further preferred, while those containing at least 1.5 succinic groups derived from (B) for each equivalent weight of substituent group derived from (A) being especially preferred.

Finally, as with the description of the substituted succinic acylating agents, the substituted acylating compositions produced by the preferred processes wherein the succinic groups derived from (B) correspond to the formulae

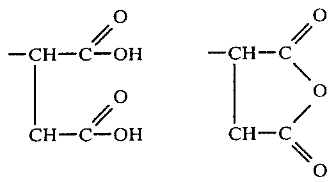

and mixtures of these constitute a preferred class.

An especially preferred process for preparing the substituted acylating compositions comprises heating at a temperature of about 160° C. to about 220° C. a mixture comprising:

(A) Polybutene characterized by a Mn value of about 1700 to about 2400 and a Mw/Mn value of about 2.5 to about 3.2, in which at least 50% of the total units derived from butenes is derived from isobutene, (B) One or more acidic reactants of the formula

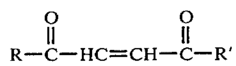

wherein R and R' are each —OH or when taken together, R and R' are —O—, and (C) Chlorine, wherein the mole ratio of (A):(B) is such that there is at least 1.5 moles of (B) for each mole of (A) and the number of moles of (A) is the quotient of the total weight of (A) divided by the value of Mn, and the amount of chlorine employed is such as to provide at least about one mole of chlorine for each mole of (B) to be reacted with (A), said acylating compositions being characterized by the presence within their structure of an average of at least 1.5 groups derived from (B) for each equivalent weight of the substituent groups derived from (A). In the same manner, substituted acylating compositions produced by such a process constitute a preferred class of such compositions.

For purposes of brevity, the terminology "acylating reagent(s)" is often used hereafter to refer, collectively, to both the substituted succinic acylating agent of this invention and to the substituted acylating compositions of this invention.

The acylating reagents of this invention have utility, in and of themselves, as additives for lubricant and fuel compositions in the same manner as the known high molecular weight carboxylic acid acylating agents of the prior art. For example, the acylating reagents of this invention which are succinic acids, succinic acid anhydrides, and lower alkyl esters of succinic acids can be used as fuel additives to reduce deposit formations for use in concentrations of about 50 to about 1000 ppm in hydrocarbon-based fuels boiling substantially in the range of 100° to 750° F. U.S. Pat. No. 3,346,354 is expressly incorporated herein by reference for instructions for using the known high molecular weight carboxylic acid acylating agents since those instructions are applicable to the acylating reagents of this invention. Similarly, U.S. Pat. No. 3,288,714 is expressly incorporated herein by reference for its teachings of how to use known high molecular weight carboxylic acid acylating agents which are succinic anhydrides as additives in lubricant compositions where they function as dispersant/detergents since these teachings are applicable to the acylating reagents of this invention.

For the same reason, U.S. Pat. No. 3,714,042 is expressly incorporated herein by reference for its teachings with respect to how to use the acylating reagents of this invention to treat overbased complexes. Thus, the acylating reagents of this invention containing succinic acid groups, succinic anhydride groups, and succinic ester groups can be used to treat basic metal sulfonate complexes, sulfonatecarboxylate complexes, and carboxylate complexes in the same manner and according to the same procedure as described in U.S. Pat. No. 3,714,042 by replacing the high molecular weight carboxylic acid acylating agents discussed therein with the acylating reagents of this invention on an equivalent weight basis.

Because the acylating reagents of this invention have utility in and of themselves, beyond that of being intermediates for preparing other novel compositions, lubricant compositions and concentrates containing the acylating reagents, as mentioned hereinbefore and described more fully hereafter constitute a part of this invention.

Nevertheless, the principle use of the acylating reagents of this invention is as intermediates in processes for preparing carboxylic derivative compositions comprising reacting one or more acylating reagents with a reactant selected from the group consisting of (a) amine characterized by the presence within its structure of at least one H—N< group, (b) alcohol, (c) reactive metal or reactive metal compound, and (d) a combination of two or more of (a) through (c), the components of (d) being reacted with said acylating reagents simultaneously or sequentially in any order.

The amine, (that is, (a) above) characterized by the presence within its structure of at least one H—N< group can be a monoamine or polyamine compound. For purposes of this invention, hydrazine and substituted hydrazines containing up to three substituents are included as amines suitable for preparing carboxylic derivative compositions. Mixtures of two or more amines can be used in the reaction with one or more acylating reagents of this invention. Preferably, the amine contains at least one primary amino group (i.e., $—NH_2$) and more preferably the amine is a polyamine, especially a polyamine containing at least two H—N< groups, either or both of which are primary or secondary amines. The polyamines not only result in carboxylic acid derivative compositions which are usually more effective as dispersant/detergent additives, relative to derivative compositions derived from monoamines, but these preferred polyamines result in carboxylic derivative compositions which exhibit more pronounced V.I. improving properties. Monoamines, and polyamines suitable as (a) are described in greater detail hereinafter.

Alcohols which can be used as (b) include the monohydric and polyhydric alcohols. Again, the polyhydric alcohols are preferred since they usually result in carboxylic derivative compositions which are more effective dispersant/detergents relative to carboxylic derivative compositions derived from monohydric alcohols. Further, the carboxylic acid derivative compositions derived from polyhydric alcohols exhibit very pronounced V.I. improving properties and are especially preferred reactants. Alcohols suitable for use as (b) are described in greater detail hereinafter.

Reactive metals and reactive metal compounds useful as (c) are those which are known to form salts and complexes when reacted with carboxylic acid and carboxylic acid acylating agents. These metals and metal compounds are described further hereinafter.

The monoamines and polyamines useful as (a) must be characterized by the presence within their structure of at least one H—N< group. Therefore, they have at least one primary (i.e., $H_2N$—) or secondary amino (i.e., H—N=) group. The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated. If unsaturated, the amine will be free from acetylenic unsaturation (i.e., —C≡C—). The amines may also contain non-hydrocarbon substituents or groups as long as these groups do not significantly interfere with the reaction of the amines with the acylating reagents of this invention. Such non-hydrocarbon substituents or groups include lower alkoxy, lower alkyl mercapto, nitro, interrupting groups such as —O— and —S— (e.g., as in such groups as —$CH_2CH_2$—X—$CH_2CH_2$— where X is —O— or —S—).

With the exception of the branched polyalkylene polyamine, the polyoxyalkylene polyamines, and the high molecular weight hydrocarbyl-substituted amines described more fully hereafter, the amines used as (a) ordinarily contain less than about 40 carbon atoms in total and usually not more than about 20 carbon atoms in total.

Aliphatic monoamines include mono-aliphatic and di-aliphatic substituted amines wherein the aliphatic groups can be saturated or unsaturated and straight or branched chain. Thus, they are primary or secondary aliphatic amines. Such amines include, for example, mono- and di-alkyl-substituted amines, mono- and di-alkenyl-substituted amines, and amines having one N-alkenyl substituent and one N-alkyl substituent and the like. The total number of carbon atoms in these aliphatic monoamines will, as mentioned before, normally not exceed about 40 and usually not exceed about 20 carbon atoms. Specific examples of such monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)-ethylamine, benzylamine, phenethylamine, and 3-(furylpropyl)amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamine, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines, and pyranyl-substituted cyclohexylamine.

Aromatic amines suitable as (a) include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthalene. Examples of aromatic monoamines include aniline, di(para-methylphenyl)amine, naphthylamine, N-(n-butyl)aniline, and the like. Examples of aliphatic-substituted, cycloaliphatic-substituted, and heterocyclic-substituted aromatic monoamines are para-ethoxyaniline, para-dodecylaniline, cyclohexyl-substituted naphthylamine, and thienyl-substituted aniline.

Polyamines suitable as (a) are aliphatic, cycloaliphatic and aromatic polyamines analogous to the above-described monoamines except for the presence within their structure of another amino nitrogen. The other amino nitrogen can be a primary, secondary or tertiary amino nitrogen. Examples of such polyamines include N-amino-propyl-cyclohexylamines, N,N′-di-n-butyl-para-phenylene diamine, bis-(para-aminophenyl)methane, 1,4-diaminocyclohexane, and the like.

Heterocyclic mono- and polyamines can also be used as (a) in making the carboxylic derivative compositions of this invention. As used herein, the terminology "heterocyclic mono- and polyamine(s)" is intended to describe those heterocyclic amines containing at least one primary or secondary amino group and at least one nitrogen as a heteroatom in the heterocyclic ring. However, as long as there is present in the heterocyclic mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain hetero atoms other than nitrogen, especially oxygen and sulfur. Obviously they can contain more than one nitrogen hetero atom. The five- and six-membered heterocyclic rings are preferred.

Among the suitable heterocyclics are aziridines, azetidines, azolidines, tetra- and di-hydro pyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N′-di-aminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

Hydroxyamines both mono- and polyamines, analogous to those described above are also useful as (a) provided they contain at least one primary or secondary amino group. Hydroxy-substituted amines having only tertiary amino nitrogen such as in tri-hydroxyethyl amine, are thus excluded as (a) (but can be used as (b) as disclosed hereafter). The hydroxy-substituted amines contemplated are those having hydroxy substituents bonded directly to a carbon atom other than a carbonyl carbon atom; that is, they have hydroxy groups capable of functioning as alcohols. Examples of such hydroxy-substituted amines include ethanolamine, di-(3-hydroxypropyl)-amine, 3-hydroxybutyl-amine, 4-hydroxybutyl-amine, diethanolamine, di-(2-hydroxypropyl)-amine, N-(hydroxypropyl)-propylamine, N-(2-hydroxyethyl)-cyclohexylamine, 3-hydroxycyclopentylamine, para-hydroxyaniline, N-hydroxyethyl piperazine, and the like.

Also suitable as amines are the aminosulfonic acids and derivatives thereof corresponding to the general formula:

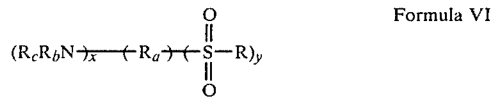

Formula VI wherein R is —OH, —$NH_2$, $ONH_4$, etc., $R_a$ is a polyvalent organic radical having a valence equal to x+y; $R_b$ and $R_c$ are each independently hydrogen, hydrocarbyl, and substituted hydrocarbyl with the proviso that at least one of $R_b$ or $R_c$ is hydrogen per aminosulfonic acid molecule; x and y are each integers equal to or greater than one. From the formula, it is apparent that each amino sulfonic reactant is characterized by at least one HN< or $H_2N$— group and at least one $$-\overset{O}{\underset{O}{\overset{\|}{\underset{\|}{S}}}}-R$$

group. These sulfonic acids can be aliphatic, cycloaliphatic, or aromatic aminosulfonic acids and the corresponding functional derivatives of the sulfo group. Specifically, the aminosulfonic acids can be aromatic aminosulfonic acids, that is, where $R_a$ is a polyvalent aromatic radical such as phenylene where at least one $$-\overset{O}{\underset{O}{\overset{\|}{\underset{\|}{S}}}}-R$$

group is attached directly to a nuclear carbon atom of the aromatic radical. The aminosulfonic acid may also be a mono-amino aliphatic sulfonic acid; that is, an acid where x is one and $R_a$ is a polyvalent aliphatic radical such as ethylene, propylene, trimethylene, and 2-methylene propylene. These aminosulfonic acids and the manner in which they can be reacted with the acylating reagents of this invention (that is, in the same way as with other carboxylic acid acylating agents), are described in detail in commonly assigned, copending application Ser. No. 310,042 filed Nov. 28, 1972 (Attorney Docket L-1391) which is expressly incorporated herein by reference for such disclosure as well as its disclosure for how to use carboxylic derivative compositions produced therefrom. Other suitable aminosulfonic acids and derivatives thereof useful as (a) are disclosed in U.S. Pat. Nos. 3,926,820; 3,029,250; and 3,367,864; which are expressly incorporated herein by reference for such disclosure.

Hydrazine and substituted-hydrazine can also be used as (a). At least one of the nitrogens in the hydrazine used as (a) must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Specific examples of substituted hydrazines are methylhydrazine, N,N-dimethyl-hydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methyl-hydrazine, N,N'-di(para-chlorophenol)-hydrazine, N-phenyl-N'-cyclohexylhydrazine, and the like.

The high molecular weight hydrocarbyl amines, both mono-amines and polyamines, which can be used as (a) are generally prepared by reacting a chlorinated polyolefin having a molecular weight of at least about 400 with ammonia or amine. Such amines are known in the art and described, for example, in U.S. Pat. Nos. 3,275,554 and 3,438,757, both of which are expressly incorporated herein by reference for their disclosure in regard to how to prepare these amines. All that is required for use of these amines as (a) is that they possess at least one primary or secondary amino group.

Another group of amines suitable for use as (a) are branched polyalkylene polyamines. The branched polyalkylene polyamines are polyalkylene polyamines wherein the branched group is a side chain containing on the average at least one nitrogen-bonded aminoalkylene

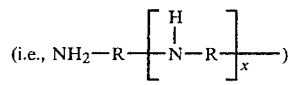

group per nine amino units present on the main chain, for examples, 1–4 of such branched chains per nine units on the main chain, but preferably one side chain unit per nine main chain units. Thus, these polyamines contain at least three primary amino groups and at least one tertiary amino group.

These reagents may be expressed by the formula:

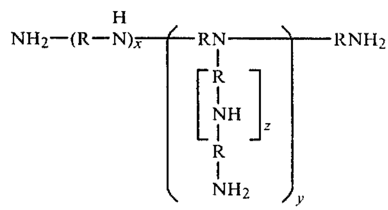

wherein R is an alkylene group such as ethylene, propylene, butylene and other homologues (both straight chained and branched), etc., but preferably ethylene; and x, y and z are integers, x being for example, from 4 to 24 or more but preferably 6 to 18, y being for example 1 to 6 or more but preferably 1 to 3, and z being for example 0–6 but preferably 0–1. The x and y units may be sequential, alternative, orderly or randomly distributed.

The preferred class of such polyamines includes those of the formula $$NH_2\left[(R-\overset{H}{N})_5-R\underset{\underset{NH_2}{|}}{\underset{R}{|}}{N}-(R-\overset{H}{N})_2\right]_n H$$

wherein n is an integer, for example, 1–20 or more but preferably 1–3, wherein R is preferably ethylene, but may be propylene, butylene, etc. (straight chained or branched).

The preferred embodiments are presented by the following formula:

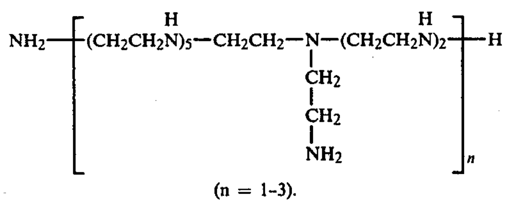

(n = 1-3).

The radicals in the brackets may be joined in a head-to-head or a head-to-tail fashion. Compounds described by this formula wherein n=1–3 are manufactured and sold as Polyamines N-400, N-800, N-1200 etc. Polyamine N-400 has the above formula wherein n=1.

U.S. Pat. Nos. 3,200,106 and 3,259,578 are expressly incorporated herein by reference for their disclosure of how to make such polyamines and processes for reacting them with carboxylic acid acylating agents since analogous processes can be used with the acylating reagents of this invention.

Suitable amines also include polyoxyalkylene polyamines, e.g., polyoxyalkylene diamines and polyoxyalkylene triamines, having average molecular weights ranging from about 200 to 4000 and preferably from about 400 to 2000. Illustrative examples of these polyoxyalkylene polyamines may be characterized by the formulae:

$$NH_2\text{—Alkylene}(\text{O—Alkylene})_m NH_2 \qquad \text{(Formula VII}$$

where m has a value of about 3 to 70 and preferably about 10 to 35.

$$R[\text{Alkylene}(\text{O—Alkylene})_n NH_2]_{3\text{-}6}$$

where n is such that the total value is from about 1 to 40 with the proviso that the sum of all of the n's is from about 3 to about 70 and generally from about 6 to about 35 and R is a polyvalent saturated hydrocarbon radical of up to ten carbon atoms having a valence of 3 to 6. The alkylene groups may be straight or branched chains and contain from 1 to 7 carbon atoms, and usually from 1 to 4 carbon atoms. The various alkylene groups present within Formulae VII and VIII may be the same or different.

More specific examples of these polyamines include:

$$NH_2\underset{CH_3}{\underset{|}{CH}}CH_2(OCH_2\underset{CH_3}{\underset{|}{CH}})_x NH_2 \qquad \text{Formula IX}$$

wherein x has a value of from about 3 to 70 and preferably from about 10 to 35 and

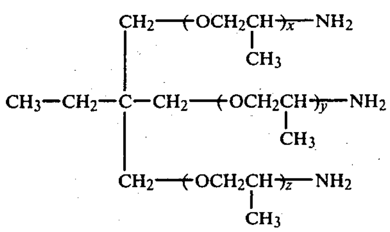

Formula X wherein x+y+z have a total value ranging from about 3 to 30 and preferably from about 5 to 10.

The preferred polyoxyalkylene polyamines for purposes of this invention include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403, etc.".

U.S. Pat. Nos. 3,804,763 and 3,948,800 are expressly incorporated herein by reference for their disclosure of such polyoxyalkylene polyamines and process for acylating them with carboxylic acid acylating agents which processes can be applied to their reaction with the acylating reagents of this invention.

The most preferred amines for use as (a) are the alkylene polyamines, including the polyalkylene polyamines, as described in more detail hereafter. The alkylene polyamines include those conforming to the formula $$H-\underset{R''}{\underset{|}{N}}(\text{Alkylene}-NR'')_n R'' \qquad \text{Formula XI}$$

wherein n is from 1 to about 10; each R' is independently a hydrogen atom, a hydrocarbyl group or a hydroxy-substituted hydrocarbyl group having up to about 30 atoms, and the "Alkylene" group has from about 1 to about 10 carbon atoms but the preferred alkylene is ethylene or propylene. Especially preferred are the alkylene polyamines where each R" is hydrogen with the ethylene polyamines and mixtures of ethylene polyamines being the most preferred. Usually n will have an average value of from about 2 to about 7. Such alkylene polyamines include methylene polyamine, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines useful in preparing the carboxylic derivative compositions include ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(-trimethylene)triamine, N-(2-aminoethyl)piperazine, 1,4-bis(2-aminoethyl)piperazine, and the like. Higher homologs as are obtained by condensing two or more of the above-illustrated alkylene amines are useful as (a) as are mixtures of two or more of any of the afore-described polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27–39, Interscience Publishers, Division of John Wiley and Sons, 1965, which is hereby incorporated by reference for their disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. The mixtures are particularly useful in preparing novel sulfur-containing compositions of matter of this invention. On the other hand, quite satisfactory products can also be obtained by the use of pure alkylene polyamines.

Hydroxyalkyl alkylene polyamines having one or more hydroxyalkyl substituents on the nitrogen atoms, are also useful in preparing amide or ester functional derivatives of the afore-described olefinic carboxylic acids. Preferred hydroxyalkyl-substituted alkylene polyamines are those in which the hydroxyalkyl group is a lower hydroxyalkyl group, i.e., having less than eight carbon atoms. Examples of such hydroxyalkyl-substituted polyamines include N-(2-hydroxyethyl-)ethylene diamine, N,N-bis(2-hydroxyethyl)ethylene diamine, 1-(2-hydroxyethyl)piperazine, monohydroxy-propyl-substituted diethylene triamine, dihydroxypropyl-substituted tetraethylene pentamine, N-(3-hydroxybutyl)tetramethylene diamine, etc. Higher homologs as are obtained by condensation of the above-illustrated hydroxy alkylene polyamines through amino radicals or through hydroxy radicals are likewise useful as (a). Condensation through amino radicals results in a higher amine accompanied by removal of ammonia and condensation through the hydroxy radicals results in products containing ether linkages accompanied by removal of water.

The carboxylic derivative compositions produced from the acylating reagents of this invention and the amines described hereinbefore produce acylated amines which include amine salts, amides, imides and imidazolines as well as mixtures thereof. To prepare carboxylic acid derivatives from the acylating reagents and the amines, one or more acylating reagents and one or more amines are heated, optionally in the presence of a normally liquid, substantially inert organic liquid solvent-/diluent, at temperatures in the range of about 80° C. up to the decomposition point (where the decomposition point is as previously defined) but normally at temperatures in the range of about 100° C. up to about 300° C. provided 300° C. does not exceed the decomposition point. Temperatures of about 125° C. to about 250° C. are normally used. The acylating reagent and the amine are reacted in amounts sufficient to provide from about one-half equivalent to about 2 moles of amine per equivalent of acylating reagent. For purposes of this invention an equivalent of amine is that amount of the amine corresponding to the total weight of amine divided by the total number of nitrogens present. Thus, octylamine has an equivalent weight equal to its molecular weight; ethylene diamine has an equivalent weight equal to one-half its molecular weight; and aminoethylpiperazine has an equivalent weight equal to one-third its molecular weight.

The numbers of equivalents of acylating reagent depends on the number of carboxylic functions (e.g.,

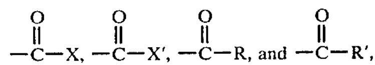

wherein X, X', R and R' are as defined above) present in the acylating reagent. Thus, the number of equivalents of acylating reagents will vary with the number of succinic groups present therein. In determining the number of equivalents of acylating reagents, those carboxyl functions which are not capable of reacting as a carboxylic acid acylating agent are excluded. In general, however, there are two equivalents of acylating reagent for each succinic group in the acylating reagents or, from another viewpoint, two equivalents for each group in the acylating reagents derived from (B); i.e., the maleic reactant from which the acylating reagent is prepared. Conventional techniques are readily available for determining the number of carboxyl functions (e.g., acid number, saponification number) and, thus, the number of equivalents of acylating reagent available to react with amine.

Because the acylating reagents of this invention can be used in the same manner as the high molecular weight acylating agents of the prior art in preparing acylated amines suitable as additives for lubricating oil compositions, U.S. Pat. Nos. 3,172,892; 3,219,666; and 3,272,746 are expressly incorporated herein by reference for their disclosure with respect to the procedures applicable to reacting the acylating reagents of this invention with the amines as described above. In applying the disclosures of these patents to the acylating reagents of this invention, the latter can be substituted for the high molecular weight carboxylic acid acylating agents disclosed in these patents on an equivalent basis. That is, where one equivalent of the high molecular weight carboxylic acylating agent disclosed in these incorporated patents is utilized, one equivalent of the acylating reagent of this invention can be used. These patents are also incorporated by reference for their disclosure of how to use the acylated amines thus produced as additives in lubricating oil compositions. Dispersant/detergent properties can be imparted to lubricating oils by incorporating the acylated amines produced by reacting the acylating reagents of this invention with the amines described above on an equal weight basis with the acylated amines disclosed in these patents. In fact, equivalent or better dispersant/detergent results can normally be achieved with lesser amounts of the product of the acylating reagents of this invention and amines.

Alcohols useful as (b) useful in preparing carboxylic derivative compositions of this invention from the acylating reagents previously described include those compounds of the general formula $$R_3\text{-(OH)}_m \qquad \text{Formula XII}$$

wherein $R_3$ is a monovalent or polyvalent organic radical joined to the —OH groups through carbon-to-oxygen bonds (that is, $$-\overset{|}{\underset{|}{C}}OH$$

wherein the carbon is not part of a carbonyl group) and m is an integer of from 1 to about 10, usually 2 to about 6. As with the amine reactant (a), the alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the mono- and polyhydric alcohols corresponding to Formula XII will usually contain not more than about 40 carbon atoms and generally not more than about 20 carbon atoms. The alcohols may contain non-hydrocarbon substituents of the same type mentioned with respect to the amines above, that is, non-hydrocarbon substituents which do not interfere with the reaction of the alcohols with the acylating reagents of this invention. In general, polyhydric alcohols are preferred. As between amines and alcohols, the polyhydric alcohols are preferred because the carboxylic derivative compositions derived therefrom (i.e., esters) exhibit exceptional V.I. improving qualities as discussed above. However, combinations of amines and polyhydric alcohols also result in carboxylic derivative compositions which have exceptional V.I. improving qualities.

Among the polyoxyalkylene alcohols suitable as (b) in the preparation of the carboxylic derivative compositions of this invention are the polyoxyalkylene alcohol demulsifiers for aqueous emulsions. The terminology "demulsifier for aqueous emulsions" as used in the present specification and claims is intended to describe those polyoxyalkylene alcohols which are capable of preventing or retarding the formation of aqueous emulsions or "breaking" aqueous emulsions. The terminology "aqueous emulsion" is generic to oil-in-water and water-in-oil emulsions.

Many commercially available polyoxyalkylene alcohol demulsifiers can be used as (b). Useful demulsifiers are the reaction products of various organic amines, carboxylic acid amides, and quaternary ammonium salts with ethyleneoxide. Such polyoxyethylated amines, amides, and quaternary salts are available from Armour Industrial Chemical Co. under the names ETHODUOMEEN T, an ethyleneoxide condensation product of an N-alkyl alkylenediamine under the name DUOMEEN T; ETHOMEENS, tertiary amines which are ethyleneoxide condensation products of primary fatty amines; ETHOMIDS, ethyleneoxide condensates of fatty acid amides; and ETHOQUADS, polyoxyethylated quaternary ammonium salts such as quaternary ammonium chlorides.

The preferred demulsifiers are liquid polyoxyalkylene alcohols and derivatives thereof. The derivatives contemplated are the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about forty carbon atoms. Specific hydrocarbyl groups are methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about twenty carbon atoms. Members of this class of alcohols are commercially available from various sources; e.g., PLURONIC polyols from Wyandotte Chemicals Corporation; POLYGLYCOL 112-2, a liquid triol derived from ethyleneoxide and propyleneoxide available from Dow Chemical Co.; and TERGITOLS, dodecylphenyl or nonylphenyl polyethylene glycol ethers, and UCONS, polyalkylene glycols and various derivatives thereof, both available from Union Carbide Corporation. However, the demulsifiers used as (b) must have an average of at least one free alcoholic hydroxyl group per molecule of polyoxyalkylene alcohol. For purposes of describing these polyoxyalkylene alcohols which are demulsifiers, an alcoholic hydroxyl group is one attached to a carbon atom that does not form part of an aromatic nucleus.

In this class of preferred polyoxyalkylene alcohols are those polyols prepared as "block" copolymers. Thus, a hydroxy-substituted compound, $R_4—(OH)_q$ (where q is 1 to 6, preferably 2 to 3, and $R_4$ is the residue of a mono- or polyhydric alcohol or mono- or polyhydroxy phenol, naphthol, etc.) is reacted with an alkylene oxide,

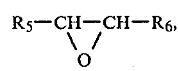

to form a hydrophobic base, $R_5$ being a lower alkyl group of up to four carbon atoms, $R_6$ being H or the same as $R_5$ with the proviso that the alkylene oxide does not contain in excess of ten carbon atoms. This base is then reacted with ethylene oxide to provide a hydrophilic portion resulting in a molecule having both hydrophobic and hydrophylic portions. The relative sizes of these portions can be adjusted by regulating the ratio of reactants, time of reaction, etc., as is obvious to those skilled in the art. It is within the skill of the art to prepare such polyols whose molecules are characterized by hydrophobic and hydrophylic moieties present in a ratio rendering them suitable as demulsifiers for aqueous emulsions in various lubricant compositions and thus suitable as (b). Thus, if more oil- solubility is needed in a given lubricant composition, the hydrophobic portion can be increased and/or hydrophylic portion decreased. If greater aqueous emulsion breaking capability is required, the hydrophylic and/or hydrophobic portions can be adjusted to accomplish this.

Compounds illustrative of $R_4\text{+}OH)_q$ include aliphatic polyols such as the alkylene glycols and alkane polyols, e.g., ethylene glycol, propylene glycol, trimethylene glycol, glycerol, pentaerythritol, erythritol, sorbitol, mannitol, and the like and aromatic hydroxy compounds such as alkylated mono- and polyhydric phenols and naphthols e.g., cresols, heptylphenols, dodecylphenols, dioctylphenols, triheptylphenols, resorcinol, pyrogallol, etc.

Polyoxyalkylene polyol demulsifiers which have two or three hydroxyl groups and molecules consisting essentially of hydrophobic portions comprising

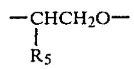

groups where $R_5$ is lower alkyl of up to three carbon atoms and hydrophylic portions comprising —$CH_2CH_2O$— groups are particularly preferred as (b). Such polyols can be prepared by first reacting a compound of the formula $R_4\text{-}(OH)_q$ where q is 2–3 with a terminal alkylene oxide of the formula

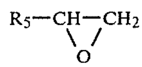

and then reacting that product with ethylene oxide. $R_4\text{-}(OH)_q$ can be, for example, TMP(trimethylolpropane), TME(trimethylolethane), ethylene glycol, trimethylene glycol, tetramethylene glycol, tri-(β-hydroxypropyl)amine, 1,4-(2-hydroxyethyl)-cyclohexane, N,N,N',N'-tetrakis(2-hydroxypropyl)ethylene diamine, N,N,N',N'-tetrakis(2-hydroxyethyl)ethylene diamine, naphthol, alkylated naphthol, resorcinol, or one of the other illustrative examples mentioned hereinbefore.

The polyoxyalkylene alcohol demulsifiers should have an average molecular weight of about 1000 to about 10,000, preferably about 2000 to about 7000. The ethyleneoxy groups (i.e., —$CH_2CH_2O$—) normally will comprise from about 5% to about 40% of the total average molecular weight. Those polyoxyalkylene polyols where the ethyleneoxy groups comprise from about 10% to about 30% of the total average molecular weight are especially useful as (b). Polyoxyalkylene polyols having an average molecular weight of about 2500 to about 6000 where approximately 10%–20% by weight of the molecule is attributable to ethyleneoxy groups result in the formation of esters having particularly improved demulsifying properties. The ester and ether derivatives of these polyols are also useful as (b).

Representative of such polyoxyalkylene polyols are the liquid polyols available from Wyandotte Chemicals Company under the name PLURONIC Polyols and other similar polyols. These PLURONIC Polyols correspond to the formula

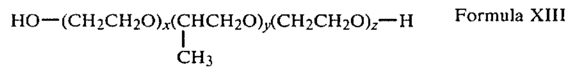

wherein x, y, and z are integers greater than 1 such that the —$CH_2CH_2O$— groups comprise from about 10% to about 15% by weight of the total molecular weight of the glycol, the average molecular weight of said polyols being from about 2500 to about 4500. This type of polyol can be prepared by reacting propylene glycol with propylene oxide and then with ethylene oxide.

Another group of polyoxyalkylene alcohol demulsifiers illustrative of the preferred glass discussed above are the commercially available liquid TETRONIC polyols sold by Wyandotte Chemicals Corporation. These polyols are represented by the general formula:

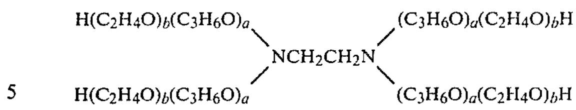

Such polyols are described in U.S. Pat. No. 2,979,528 which is expressly incorporated herein by reference. Those polyols corresponding to the above formula having an average molecular weight of up to about 10,000 wherein the ethyleneoxy groups contribute to the total molecular weight in the percentage ranges discussed above are preferred. A specific example would be such a polyol having an average molecular weight of about 8000 wherein the ethyleneoxy groups account for 7.5%–12% by weight of the total molecular weight. Such polyols can be prepared by reacting an alkylene diamine such as ethylene diamine, propylene diamine, hexamethylene diamine, etc., with propylene oxide until the desired weight of the hydrophobic portion is reached. Then the resulting product is reacted with ethylene oxide to add the desired number of hydrophilic units to the molecules.

Another commercially available polyoxyalkylene polyol demulsifier falling within this preferred group is Dow Polyglycol 112-2, a triol having an average molecular weight of about 4000–5000 prepared from propylene oxides and ethylene oxides, the ethyleneoxy groups comprising about 18% by weight of the triol. Such triols can be prepared by first reacting glycerol, TME, TMP, etc., with propylene oxide to form a hydrophobic base and reacting that base with ethylene oxide to add hydrophilic portions.

Alcohols useful as (b) also include alkylene glycols and polyoxyalkylene alcohols such as polyoxyethylene alcohols, polyoxypropylene alcohols, polyoxbutylene alcohols, and the like. These polyoxyalkylene alcohols (sometimes called polyglycols) can contain up to about 150 oxyalkylene groups wherein the alkylene radical contains from 2 to about 8 carbon atoms. Such polyoxyalkylene alcohols are generally dihydric alcohols. That is, each end of the molecule terminates with a —OH group. In order for such polyoxyalkylene alcohols to be useful as (b), there must be at least one such —OH group. However, the remaining —OH group can be esterified with a monobasic, aliphatic or aromatic carboxylic acid of up to about 20 carbon atoms such as acetic acid, propionic acid, oleic acid, stearic acid, benzoic acid, and the like. The monoethers of these alkylene glycols and polyoxyalkylene glycols are also useful as (b). These include the monoaryl ethers, monoalkyl ethers, and monoaralkyl ethers of these alkylene glycols and polyoxyalkylene glycols. This group of alcohols can be represented by the general formula

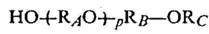

Formula XIV where $R_C$ is aryl such as phenyl, lower alkoxy phenyl, or lower alkyl phenyl; lower alkyl such as ethyl, propyl, tertbutyl, pentyl, etc.; and aralkyl such as benzyl, phenylethyl, phenylpropyl, p-ethylphenylethyl, etc.; p is zero to about 150, and $R_A$ and $R_B$ are lower alkylene of two up to about eight, preferably, two to four, carbon atoms. Polyoxyalkylene glycols where the alkylene groups are ethylene or propylene and p is at least two as well as the monoethers thereof as described above are very useful.

The monohydric and polyhydric alcohols useful as (b) include monohydroxy and polyhydroxy aromatic compounds. Monohydric and polyhydric phenols and naphthols are preferred hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain 1 to 4 hydroxy groups. The aromatic hydroxy compounds are illustrated by the following specific examples: phenol, p-chlorophenol, p-nitrophenol, beta-naphthol, alpha-naphthol, cresols, resorcinol, catechol, carvacrol, thymol, eugenol, p,p'-dihydroxybiphenyl, hydroquinone, pyrogallol, phloroglucinol, hexylresorcinol, orcin, guaiacol, 2-chlorophenol, 2,4-dibutylphenol, propenetetramer-substituted phenol, didodecylphenol, 4,4'-methylene-bis-methylene-bis-phenol, alpha-decyl-beta-naphthol, polyisobutenyl-(molecular weight of about 1000)substituted phenol, the condensation product of heptylphenol with 0.5 moles of formaldehyde, the condensation product of octylphenol with acetone, di(hydroxyphenyl)oxide, di(hydroxyphenyl)sulfide, di(hydroxyphenyl)disulfide, and 4-cyclohexylphenol. Phenol itself and aliphatic hydrocarbon-substituted phenols, e.g., alkylated phenols having up to 3 aliphatic hydrocarbon substituents are especially preferred. Each of the aliphatic hydrocarbon substituents may contain 100 or more carbon atoms but usually will have from 1 to 20 carbon atoms. Alkyl and alkenyl groups are the preferred aliphatic hydrocarbon substituents.

Further specific examples of monohydric alcohols which can be used as (b) include monohydric alcohols such as methanol, ethanol, isooctanol, dodecanol, cyclohexanol, cyclopentanol, behenyl alcohol, hexatriacontanol, neopentyl alcohol, isobutyl alcohol, benzyl alcohol, beta-phenethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tert-butyl alcohol, 5-bromo-dodecanol, nitro-octadecanol, and dioleate of glycerol. Alcohols within (b) may be unsaturated alcohols such as allyl alcohol, cinnamyl alcohol, 1-cyclohexene-3-ol and oleyl alcohol.

Other specific alcohols useful as (b) are the ether alcohols and amino alcohols including, for example, the oxyalkylene, oxy-arylene-, amino-alkylene-, and aminoarylene-substituted alcohols having one or more oxyalkylene, aminoalkylene or amino-aryleneoxy-arylene radicals. They are exemplified by Cellosolve, carbitol, phenoxyethanol, heptylphenyl-(oxypropylene)$_6$-OH, octyl-(oxyethylene)$_{30}$-OH, phenyl-(oxyoctylene)$_2$-OH, mono-(heptylphenyl-oxypropylene)substituted glycerol, poly(styreneoxide), aminoethanol, 3-aminoethylpentanol, di(hydroxyethyl)amine, p-aminophenol, tri(hydroxypropyl)amine, N-hydroxyethyl ethylenediamine, N,N,N',N'-tetrahydroxy-trimethylenediamine, and the like.

The polyhydric alcohols preferably contain from 2 to about 10 hydroxy radicals. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene radicals contains 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexane diol, pinacol, erythritol, arabitol, sorbitol, mannitol, 1,2-cyclohexanediol, and xylene glycol. Carbohydrates such as sugars, starches, celluloses, and so forth likewise can be used as (b). The carbohydrates may be exemplified by glucose, fructose, sucrose, rhamnose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful as (b). Further specific examples of such partially esterified polyhydric alcohols are the monooleate of sorbitol, distearate of sorbitol, monooleate of glycerol, monostearate of glycerol, di-dodecanoate of erythritol, and the like.

A preferred class of alcohols suitable as (b) are those polyhydric alcohols containing up to about twelve carbon atoms, and especially those containing three to ten carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, guinic acid, 2,2,6,6-tetrakis-(hydroxymethyl)cyclohexanol, 1,10-decanediol, digitalose, and the like. Aliphatic alcohols containing at least three hydroxyl groups and up to ten carbon atoms are particularly preferred.

An especially preferred class of polyhydric alcohols for use as (b) are the polyhydric alkanols containing three to ten carbon atoms and particularly, those containing three to six carbon atoms and having at least three hydroxyl groups. Such alcohols are exemplified by glycerol, erythritol, pentaerythritol, mannitol, sorbitol, 2-hydroxymethyl-2-methyl-1,3-propanediol(trimethylolethane), 2-hydroxymethyl-2-ethyl-1,3-propanediol(trimethylopropane), 1,2,4-hexanetriol, and the like.

From what has been stated above, it is seen that (a) may contain alcoholic hydroxy substituents and (b) can contain primary, secondary, or tertiary amino substituents. Thus, amino alcohols can fall into both (a) and (b) provided they contain at least one primary or secondary amino group. If only tertiary amino groups are present, the amino alcohol belong only in (b).

Amino alcohols contemplated as suitable for use as (a) and/or (b) have one or more amine groups and one or more hydroxy groups. Examples of suitable amino alcohols are the N-(hydroxy-lower alkyl)amines and polyamines such as 2-hydroxyethylamine, 3-hydroxybutylamine, di-(2-hydroxyethyl)amine, tri-(2-hydroxyethyl)amine, di-(2-hydroxypropyl)amine, N,N,N'-tri-(2-hydroxyethyl)ethylenediamine, N,N,N',N'-tetra(2-hydroxyethyl)ethylenediamine, N-(2-hydroxyethyl)-piperazine, N,N'-di-(3-hydroxypropyl)piperazine, N-(2-hydroxyethyl)morpholine, N-(2-hydroxyethyl)-2-morpholinone, N-(2-hydroxyethyl)-3-methyl-2-morpholinone, N-(2-hydroxypropyl)-6-methyl-2-morpholinone, N-(2-hydroxyethyl)-5-carbethoxy-2-piperidone, N-(2-hydroxypropyl)-5-carbethoxy-2-piperidone, N-(2-hydroxyethyl)-5-(N-butylcarbamyl)-2-piperidone, N-

(2-hydroxyethyl)piperidine, N-(4-hydroxybutyl)piperidine, N,N-di-(2-hydroxyethyl)glycine, and ethers thereof with aliphatic alcohols, especially lower alkanols, N,N-di(3-hydroxypropyl)glycine, and the like. Also contemplated are other mono- and poly-N-hydroxyalkyl-substituted alkylene polyamines wherein the alkylene polyamine are as described above; especially those that contain two to three carbon atoms in the alkylene radicals and the alkylene polyamine contains up to seven amino groups such as the reaction product of about two moles of propylene oxide and one mole of diethylenetriamine.

Further amino alcohols are the hydroxy-substituted primary amines described in U.S. Pat. No. 3,576,743 by the general formula $$R_a—NH_2$$

where $R_a$ is a monovalent organic radical containing at least one alcoholic hydroxyl group, according to this patent, the total number of carbon atoms in $R_a$ will not exceed about 20. Hydroxy-substituted aliphatic primary amines containing a total of up to about 10 carbon atoms are particularly useful. Especially preferred are the polyhydroxy-substituted alkanol primary amines wherein there is only one amino group present (i.e., a primary amino group) having one alkyl substituent containing up to 10 carbon atoms and up to 6 hydroxyl groups. These alkynol primary amines correspond to $R_a—NH_2$ where $R_a$ is a mono- or polyhydroxy-substituted alkyl group. It is desirable that at least one of the hydroxyl groups be a primary alcoholic hydroxyl group. Trismethylolaminomethane is the single most preferred hydroxy-substituted primary amine. Specific examples of the hydroxy-substituted primary amines include 2-amino-1-butanol, 2-amino-2-methyl-1-propanol, p-(beta-hydroxyethyl)-analine, 2-amino-1-propanol, 3-amino-1-propanol, 2-amino-2-methyl-1,3-propanediol, 2-amino-2-ethyl-1,3-propanediol, N-(beta-hydroxypropyl)-N'-betaaminoethyl)-piperazine, tris(-hydroxymethyl)amino methane (also known as trismethylolamino methane), 2-amino-1-butynol, ethanolamine, beta-(beta-hydroxy ethoxy)-ethyl amine, glucamine, glucosamine, 4-amino-3-hydroxy-3-methyl-1-butene (which can be prepared according to procedures known in the art by reacting isopreneoxide with ammonia), N-(3-aminopropyl)-4-(2-hydroxyethyl)-piperadine, 2-amino-6-methyl-6-hepanol, 5-amino-1-pentanol, N-(beta-hydroxyethyl)-1,3-diamino propane, 1,3-diamino-2-hydroxy-propane, N-(beta-hydroxy ethoxyethyl)-ethylenediamine, and the like. For further description of the hydroxy-substituted primary amines contemplated as being useful as (a), and/or (b), U.S. Pat. No. 3,576,743 is expressly incorporated herein by reference for its disclosure of such amines.

The carboxylic derivative compositions produced by reacting the acylating reagents of this invention with alcohols are esters. Both acidic esters and neutral esters are contemplated as being within the scope of this invention. Acidic esters are those in which some of the carboxylic acid functions in the acylating reagents are not esterified but are present as free carboxyl groups. Obviously, acid esters are easily prepared by using an amount of alcohol insufficient to esterify all of the carboxyl groups in the acylating reagents of this invention.

The acylating reagents of this invention are reacted with the alcohols according to conventional esterification techniques. This normally involves heating the acylating reagent of this invention with the alcohol, optionally in the presence of a normally liquid, substantially inert, organic liquid solvent/diluent and/or in the presence of esterification catalyst. Temperatures of at least about 100° C. up to the decomposition point are used (the decomposition point having been defined hereinbefore). This temperature is usually within the range of about 100° C. up to about 300° C. with temperatures of about 140° C. to 250° C. often being employed. Usually, at least about one-half equivalent of alcohol is used for each equivalent of acylating reagent. An equivalent of acylating reagent is the same as discussed above with respect to reaction with amines. An equivalent of alcohol is its molecular weight divided by the total number of hydroxyl groups present in the molecule. Thus, an equivalent weight of ethanol is its molecular weight while the equivalent weight of ethylene glycol is one-half its molecular weight.

Many issued patents disclose procedures for reacting high molecular weight carboxylic acid acylating agents with alcohols to produce acidic esters and neutral esters. These same techniques are applicable to preparing esters from the acylating reagents of this invention and the alcohols described above. All that is required is that the acylating reagents of this invention is substituted for the high molecular weight carboxylic acid acylating agents discussed in these patents, usually on an equivalent weight basis. The following U.S. Patents are expressly incorporated herein by reference for their disclosure of suitable methods for reacting the acylating reagents of this invention with the alcohols described above: U.S. Pat. Nos. 3,331,776; 3,381,022; 3,522,179; 3,542,680; 3,697,428; 3,755,169.

Reactive metals or reactive metal compounds useful as (c) are those which will form carboxylic acid metal salts with the acylating reagents of this invention and those which will form metal-containing complexes with the carboxylic derivative compositions produced by reacting the acylating reagents with amines and/or alcohols as discussed above. Reactive metal compounds useful as (c) for the formation of complexes with the reaction products of the acylating reagents of this invention and amines are disclosed in U.S. Pat. No. 3,306,908. Complex-forming metal reactants useful as (c) include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or co-ordination metals, i.e., they are capable of forming complexes by means of their secondary or co-ordination valence. Specific examples of the complex-forming metal compounds useful as the reactant in this invention are cobaltous nitrate, cobaltous oxide, cobaltic oxide, cobalt nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monooxide, manganese dioxide, manganese trioxide, manganese heptoxide, manganic phosphate, manganous pyrophosphate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfite, ferric hydrosulfite, nickel dibromide, nickel dichloride, nickel nitrate, nickel dioleate, nickel stearate, nickel sulfite, cupric propionate, cupric acetate, cupric metaborate, cupric benzoate, cupric formate, cupric laurate, cupric nitrite; cupric oxychloride, cupric palmitate, cupric salicylate, zinc benzoate, zinc borate, zinc bromide, zinc chromate, zinc dichromate, zinc iodide, zinc lactate, zinc nitrate, zinc oxide, zinc stearate, zinc sulfite, cadmium benzoate, cadmium carbonate, cadmium butyrate, cadmium chloroacetate, cadmium fumerate, cadmium nitrate, cadmium di-hydrogenphosphate, cadmium sulfite, and cadmium oxide. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the carboxylic derivative compositions of the acylating reagents of this invention with the amines as described above by substituting, or on an equivalent basis, the acylating reagents of this invention with the high molecular weight carboxylic acid acylating agents disclosed in U.S. Pat. No. 3,306,908. The ratio of equivalents of the acylated amine thus produced and the complex-forming metal reactant remains the same as disclosed in U.S. Pat. No. 3,306,908 patent.

U.S. Pat. No. Re. 26,433 discloses metals useful in preparing salts from the carboxylic derivative compositions of acylating reagents of this invention and amines as described hereinabove. Metal salts are prepared, according to this patent, from alkali metals, alkaline earth metals, zinc, cadmium, lead, cobalt and nickel. Examples of a reactive metal compound suitable for use as (c) are sodium oxide, sodium hydroxide, sodium carbonate, sodium methylate, sodium propylate, sodium pentylate, sodium phenoxide, potassium oxide, potasium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium caronate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium, iodide, magnesium phenoxide, zinc oxide, zinc hydroxide, zinc carbonate, zinc methylate, zinc propylate, zinc pentylate, zinc chloride, zinc fluoride, zinc nitrate trihydrate, cadmium oxide, cadmium hydroxide, cadmium carbonate, cadmium methylate, cadmium propylate, cadmium chloride, cadmium bromide, cadmium fluoride, lead oxide, lead hydroxide, lead carbonate, lead ethylate, lead pentylate, lead chloride, lead fluoride, lead iodide, lead nitrate, nickel oxide, nickel hydroxide, nickel carbonate, nickel chloride, nickel bromide, nickel fluoride, nickel methylate, nickel pentylate, nickel nitrate hexahydrate, cobalt oxide, cobalt hydroxide, cobaltous bromide, cobaltous chloride, cobalt butylate, cobaltous nitrate hexahydrate, etc. The above metal compounds are merely illustrative of those useful in this invention and the invention is not to be considered as limited to such.

U.S. Pat. No. Re. 26,433 is expressly incorporated herein by reference for its disclosure of reactive metal compounds useful as (c) and processes for utilizing these compounds in the formation of salts. Again, in applying the teachings of this patent to the present invention, it is only necessary to substitute the acylating reagents of this invention on an equivalent weight basis for the high molecular weight carboxylic acylating agents of the reissue patent.

U.S. Pat. No. 3,271,310 discloses the preparation of metal salt of high molecular weight carboxylic acid acylating agents, in particular alkenyl succinic acids. The metal salts disclosed therein are acid salts, neutral salts, and basic salts. Among the illustrative reactive metal compounds used to prepare the acidic, neutral and basic salts of the high molecular weight carboxylic acids disclosed in U.S. Pat. No. 3,271,310 are lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, and nickel carbonate. The present invention is not to be considered as limited to the use of the above metal compounds; they are presented merely to illustrate the metal compounds included within the invention.

U.S. Pat. No. 3,271,310 is expressly incorporated herein by reference for its disclosure of suitable reactive metal compounds for forming salts of the acylating reagents of this invention as well as illustrative processes for preparing salts of these acylating reagents. As will be apparent, the processes of U.S. Pat. No. 3,271,310 are applicable to the acylating reagents of this invention merely by substituting on an equivalent weight basis, the acylating reagents of this invention for the high molecular weight carboxylic acids of the patent.

From the foregoing description, it is apparent that the acylating reagents of this invention can be reacted with any individual amine, alcohol, reactive metal, reactive metal compound or any combination of two or more of any of these; that is, for example, one or more amines, one or more alcohols, one or more reactive metals or reactive metal compounds, or a mixture of any of these. The mixture can be a mixture of two or more amines, a mixture of two or more alcohols, a mixture of two or more metals or reactive metal compounds, or a mixture of two or more components selected from amines and alcohols, from amines and reactive metals or reactive metal compounds, from alcohols and reactive metals compounds, or one or more components from each of the amines, alcohols, and reactive metal or reactive metal compounds. Furthermore, the acylating reagents of this invention can be reacted with the amines, alcohols, reactive metals, reactive metal compounds, or mixtures thereof, as described above, simultaneously (concurrently) or sequentially in any order of reaction.

Canadian Pat. No. 956,397 is expressly incorporated herein by reference for its disclosure of procedures for reacting the acylating reagents of this invention with amines, alcohols, reactive metal and reactive metal compounds, or mixtures of these, sequentially and simultaneously. All that is required to apply the processes of that patent to this invention is to substitute, on an equivalent weight basis, the acylating reagents of this invention for the high molecular weight carboxylic acid acylating agents disclosed in that Canadian patent. Carboxylic acid derivatives of this invention prepared utilizing the processes disclosed in the Canadian patent constitute a preferred class of carboxylic acids or carboxylic acid derivative compositions. The following U.S. Patents are also incorporated herein by reference, being counterparts of the incorporated Canadian patent, for the same reasons given for incorporating the Canadian patent: U.S. Pat. Nos. 3,836,469; 3,836,470; 3,836,471; 3,838,050; 3,838,052; 3,879,308; 3,957,854; 3,957,855. For the same reason, commonly assigned U.S. Application Ser. No. 644,677 filed Dec. 29, 1975 (attorney Docket L-1548) is also expressly incorporated herein by reference. The Canadian patent and the U.S. patents and applications, which are counterparts thereof as identified above, are also incorporated herein to illustrate that the amount of polyoxyalkylene alcohol demulsifier utilized in preparing dispersant/detergents from the acylating reagents of this invention is normally quite small on an equivalent basis.

It is also pointed out that, among the more preferred carboxylic derivative compositions of this invention are those prepared according to the Canadian patent and corresponding U.S. patent and application identified above in which the polyoxyalkylene alcohol demulsifier has been omitted. In other words, a preferred class of carboxylic derivative compositions of this invention are the various reaction products of the high molecular weight carboxylic acid acylating agents of the Canadian patent with one or more amines, alcohols, and reactive metal compounds as disclosed therein differing only in that the acylating reagents of this invention are substituted on an equivalent weight basis and, further, that the polyoxyalkylene alcohol demulsifier reactant is omitted.

In addition, U.S. Pat. No. 3,806,456 is expressly incorporated herein by reference for its disclosure of processes useful in preparing products from the acylated reagents of this invention and polyoxyalkylene polyamines as described hereinbefore. Substitution of the acylated reactants of this invention for the high molecular weight carboxylic acid acylating agents disclosed in U.S. Pat. No. 3,806,456 on an equivalent weight basis produces compounds of similar utility further characterized by the desired viscosity index improving properties discussed hereinbefore.

U.S. Pat. No. 3,576,743 is also incorporated herein by reference for its disclosure of a process for preparing carboxylic derivative compositions from both polyhydric alcohols and amine; in particular, hydroxy-substituted primary amines. Again, substitution of the acylating reagents of this invention on an equivalent weight basis for the high molecular carboxylic acid acylating agents disclosed in 3,576,743 provides compositions having the desired dispersant/detergent compositions and the V.I. improving properties already discussed.

U.S. Pat. No. 3,632,510 is expressly incorporated herein by reference for its disclosure of processes for preparing mixed ester-metal salts. Mixed ester-metal salts derived from acylating reagents of this invention, the alcohols, and the reactive metal compounds can be prepared by following the processes disclosed in U.S. Pat. No. 3,632,510 but substituting, on an equivalent weight basis, the acylating reagents of this invention for the high molecular weight carboxylic acid acylating agents of the patent. The carboxylic acid derivative compositions thus produced also represent a preferred aspect of this invention.

Finally, U.S. Pat. Nos. 3,755,169; 3,804,763; 3,868,330; and 3,948,800 and expressly incorporated herein by reference for their disclosure of how to prepare carboxylic acid derivative compositions. By following the teachings of these patents and substituting the acylating reagents of this invention for the high molecular weight carboxylic acylating agents of the patents, a wide range of carboxylic derivative compositions within the scope of the present invention can be prepared.

Incorporation of so many patents is done for the sake of brevity and because, it is felt, that the procedures necessary to prepare the carboxylic derivative compositions from the acylating reagents and the amines, alcohols, and reactive metals and reactive metal compounds, as well as mixtures thereof, is well within the skill of the art, such that a detaled description herein is not necessary.

Of the carboxylic derivative compositions described hereinabove, those prepared from novel acylating reagents and the alkylene polyamines, especially polyethylene polyamines, and/or polyhydric alcohols, especially the polyhydric alkanols, are especially preferred. As previously stated, mixtures of polyamines and/or polyhydric alcohols are contemplated. Normally, all the carboxyl functions on the acylating reagents of this invention will either be esterified or involved in formation of an amine salt, amide, imide or imidazoline in this preferred group of carboxylic derivative compositions.

As mentioned previously, in order to achieve the requisite degree of viscosity index improving capabilities in the carboxylic derivative compositions of this invention, it has been found necessary to react the acylating reagents of this invention with polyfunctional reactants. For example, polyamines having two or more primary and/or secondary amino groups, polyhydric alcohols, amino alcohols in which there are one or more primary and/or secondary amino groups and one or more hydroxy groups, and polyvalent metal or polyvalent metal compounds. It is believed that the polyfunctional reactants serve to provide "bridges" or crosslinking in the carboxylic derivative compositions and this, in turn, is somehow responsible for the viscosity index-improving properties. However, the mechanism by which viscosity index improving properties is obtained is not understood and applicants do not intend to be bound by this theory. Since the carboxylic derivative compositions derived, in whole or in part, from polyhydric alcohols appear to be particularly effective in permitting a reduction of V.I. improver in lubricating compositions, the polyfunctionality of reactants (a), (b), and (c) may not fully explain the V.I. improving properties of the carboxylic derivative compositions.

Obviously, however, it is not necessary that all of the amine, alcohol, reactive metal, or reactive metal compound reacted with the acylating reagents be polyfunctional. Thus, combinations of mono- and polyfunctional amines, alcohols, reactive metals and reactive metal compounds can be used; for example, monoamine with a polyhydric alcohol, a monohydric alcohol with polyamine, an amino alcohol with a reactive metal compound in which the metal is monovalent, and the like.

While the parameters have not been fully determined as yet, it is believed that acylating reagents of this invention should be reacted with amines, alcohols, reactive metals, reactive metal compounds, or mixtures of these which contain sufficient polyfunctional reactant, (e.g., polyamine, polyhydric alcohol) so that at least about 25% of the total number of carboxyl groups (from the succinic groups or from the groups derived from the maleic reactant) are reacted with a polyfunctional reactant. Better results, insofar as the viscosity index-improving facilities of the carboxylic derivative compositions is concerned, appear to be obtained when at least 50% of the carboxyl groups are involved in reaction with such polyfunctional reactants. In most instances, the best viscosity index improving properties seem to be achieved when the acylating reagents of this invention are reacted with a sufficient amount of polyamine and/or polyhydric alcohol (or amino alcohol) to react with at least about 75% of the carboxyl group. It should be understood that the foregoing percentages are "theoretical" in the sense that it is not required that the stated percentage of carboxyl functions actually react with polyfunctional reactant. Rather these percentages are used to characterize the amounts of polyfunctional reactants desirably "available" to react with the acylating reagents in order to achieve the desired viscosity index improving properties.

From what has been stated, it is apparent that the carboxylic derivative compositions of this invention can be considered somewhat analogous to the derivatives prepared from the high molecular weight carboxylic acid acylating reagents disclosed in the patents cited and incorporated herein. However, because of their unique multifunctional properties, the carboxylic derivative compositions of this invention are uniquely different in important aspects.

Another aspect of this invention involves the post-treatment of the carboxylic derivative compositions. The process for post-treating the carboxylic acid derivative compositions is again analogous to the post-treating processes used with respect to similar derivatives of the high molecular weight carboxylic acid acylating agents of the prior art. Accordingly, the same reaction conditions, ratio of reactants and the like can be used.

Acylated nitrogen compositions prepared by reacting the acylating reagents of this invention with an amine as described above are post-treated by contacting the acylated nitrogen compositions thus formed (e.g., the carboxylic derivative compositions) with one or more post-treating reagents selected from the group consisting of boron oxide, boron oxide hydrate, boron halides, boron acids, esters of boron acids, carbon disulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols. The same post-treating reagents are used with carboxylic derivative compositions prepared from the acylating reagents of this invention and a combination of amines and alcohols as described above. However, when the carboxylic derivative compositions of this invention are derived from alcohols and the acylating reagents, that is, when they are acidic or neutral esters, the post-treating reagents are usually selected from the group consisting of boron oxide, boron oxide hydrate, boron halides, boron acids, esters of boron acids, sulfur, sulfur chlorides, phosphorus sulfides, phosphorus oxides, carboxylic acid acylating agents, epoxides, and episulfides.

Since post-treating processes involving the use of these post-treating reagents is known insofar as application to reaction products of high molecular weight carboxylic acid acylating agents of the prior art and amines and/or alcohols, detailed descriptions of these processes herein is unnecessary. In order to apply the prior art processes to the carboxylic derivative compositions of this invention, all that is necessary is that reaction conditions, ratio of reactants, and the like as described in the prior art, be applied to the novel carboxylic derivative compositions of this invention. The following U.S. patents are expressly incorporated herein by reference for their disclosure of post-treating processes and post-treating reagents applicable to the carboxylic derivative compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012 (use of acidified clays in post-treating carboxylic derivative compositions derived from the acylating reagents of this invention and amines); 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Pat. No. 1,085,903; UK Pat. No. 1,162,436; U.S. Pat. No. 3,558,743. The processes of these incorporated patents, as applied to the carboxylic derivative compositions of this invention, and the post-treated carboxylic derivative compositions thus produced constitute a further aspect of this invention.

As previously indicated, the acylating reagents, the carboxylic derivative compositions, and the post-treated carboxylic derivative compositions of this invention are useful as additives in lubricating oils. From the foregoing description, it is seen that the acylating reagents, the carboxylic derivative compositions, and the post-treated carboxylic derivative compositions, especially the latter two, function primarily as dispersant/detergents and viscosity index improvers.

The lubricant compositions of this invention include lubricating oils and greases although, for the most part, they will be lubricating oils. The lubricating oil compositions of this invention are based on natural and synthetic lubricating oils and mixtures thereof. These lubricants include crankcase lubricating oils for spark-ignited and compression-ignited internal combustion engines, such as automobile and truck engines, marine and railroad diesel engines, and the like. Automatic transmission fluids, transaxle lubricants, gear lubricants, metal-working lubricants, hydraulic fluids and other lubricating oil and grease compositions can also benefit from the incorporation therein of the acylating reagents and carboxylic derivative compositions of the present invention.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins [e.g., polybutylenes, polypropylenes, propylene-isobutylene copolymers, chlorinated polybutylenes, etc.); poly(1-hexenes), poly(1-octenes), poly(1-decenes), etc. and mixtures thereof]; alkylbenzenes (e.g., dodecylbenzenes, tetradecylbenzenes, dinonylbenzenes, di(2-ethylhexyl)benzenes, etc.); polyphenyls (e.g., biphenyls, terphenyls, alkylated polyphenyls, etc.), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-ethylhexyl) silicate, tetra-(p-tert-butylphenyl) silicate, hexa-(4-methyl-2-pentoxy)-disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decylphosphonic acid, etc.), polymeric tetrahydrofurans and the like.

Unrefined, refined and rerefined oils, either natural or synthetic (as well as mixtures of two or more of any of these) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In general, about 0.05–30, usually about 0.1–15 parts (by weight) of at least one acylating reagent, carboxylic derivative composition, or post-treated carboxylic derivative composition of this invention is dissolved or stably dispersed in 100 parts of oil to produce a satisfactory lubricant. The invention also contemplates the use of other additives in combination with the compositions of this invention. Such additives include, for example, fluidity modifiers, auxiliary detergents and dispersants of the ash-producing or ashless type, oxidation-inhibiting agents, pour point depressing agents, extreme pressure agents, color stabilizers and anti-foam agents.

The acylating reagents, carboxylic derivative compositions, and post-treated carboxylic derivative compositions of this invention can be added directly to a lubricant such as a lubricating oil to form the lubricant compositions of this invention or they can be diluted with at least one substantially inert, normally liquid organic solvent/diluent such as low viscosity oil to form concentrates which are then added to lubricating oils in sufficient amounts to form the lubricant compositions of this invention. These concentrates normally contain from about 20 to about 90% by weight of the normally liquid, substantially inert organic solvent/diluent and from about 10% to about 80% by weight of the acylating reagent, carboxylic derivative composition, post-treated carboxylic derivative composition, or mixtures of two or more of these. As is conventional in the art, one or more other additives to be used in the final lubricant composition can be included in the concentrates of this invention.

Another advantage of the carboxylic derivative compositions of this invention, particularly those derived from the reaction of the acylating reagents of this invention with polyamines and/or polyhydric alcohols is their effectiveness as dispersant/detergents in certain "problem" mineral oils. Many mineral oils contain aromatic hydrocarbon components, most of the aromatic hydrocarbon components being fused ring aromatic hydrocarbons. For reasons not fully understood, oils containing in excess of about 3% by weight of such aromatic hydrocarbons resist improvement with conventional amounts of known dispersant/detergents. The carboxylic derivative compositions of this invention, especially those derived from the reaction of the acylating reagents of this invention with one or more polyethylene polyamines and/or one or more polyhydric alkanols, have proven unexpectedly superior to the known dispersant/detergents in treating such oils.

Various preferred aspects of this invention and the means for preparing the acylating reagents, carboxylic acid derivative compositions, and the post-treated carboxylic acid derivative compositions are illustrated by the following examples. These examples illustrate presently preferred embodiments of this invention. In the following examples, and elsewhere in the present specification and claims, all percentages and all parts are intended to express percent by weight and parts by weight unless otherwise clearly indicated.

EXAMPLE 1

A mixture of 510 parts (0.28 mole) of polyisobutene ($\overline{M}n=1845$; $\overline{M}w=5325$) and 59 parts (0.59 mole) of maleic anhydride is heated to 110° C. This mixture is heated to 190° C. in seven hours during which 43 parts (0.6 mole) of gaseous chlorine is added beneath the surface. At 190°-192° C. an additional 11 parts (0.16 mole) of chlorine is added over 3.5 hours. The reaction mixture is stripped by heating at 190°-193° C. with nitrogen blowing for 10 hours. The residue is the desired polyisobutene-substituted succinic acylating agent having a saponification equivalent number of 87 as determined by ASTM procedure D-94.

EXAMPLE 2

A mixture of 1,000 parts (0.495 mole) of polyisobutene ($\overline{M}n=2020$; $\overline{M}w=6049$) and 115 parts (1.17 moles) of maleic anhydride is heated to 110° C. This mixture is heated to 184° C. in 6 hours during which 85 parts (1.2 moles) of gaseous chlorine is added beneath the surface. At 184°-189° C. an additional 59 parts (0.83 mole) of chlorine is added over 4 hours. The reaction mixture is stripped by heating at 186°-190° C. with nitrogen blowing for 26 hours. The residue is the desired polyisobutene-substituted succinic acylating agent having a saponification equivalent number of 87 as determined by ASTM procedure D-94.

EXAMPLE 3

A mixture of 3,251 parts of polyisobutene chloride, prepared by the addition of 251 parts of gaseous chlorine to 3,000 parts of polyisobutene ($\overline{M}n=1696$; $\overline{M}w=6594$) at 80° C. in 4.66 hours, and 345 parts of maleic anhydride is heated to 200° C. in 0.5 hour. The reaction mixture is held at 200°-224° C. for 6.33 hours, stripped at 210° C. under vacuum and filtered. The filtrate is the desired polyisobutene-substituted succinic acylating agent having a saponification equivalent number of 94 as determined by ASTM procedure D-94.

EXAMPLE 4

A mixture of 3,000 parts (1.63 moles) of polyisobutene ($\overline{M}n=1845$; $\overline{M}w=5325$) and 344 parts (3.51 moles) of maleic anhydride is heated to 140° C. This mixture is heated to 201° C. in 5.5 hours during which 312 parts (4.39 moles) of gaseous chlorine is added beneath the surface. The reaction mixture is heated at 201°-236° C. with nitrogen blowing for 2 hours and stripped under vacuum at 203° C. The reaction mixture is filtered to yield the filtrate as the desired polyisobutene-substituted succinic acylating agent having a saponification equivalent number of 92 as determined by ASTM procedure D-94.

EXAMPLE 5

A mixture of 3,000 parts (1.49 moles) of polyisobutene ($\overline{M}n=2020$; $\overline{M}w=6049$) and 364 parts (3.71 moles) of maleic anhydride is heated at 220° C. for 8 hours. The reaction mixture is cooled to 170° C. At 170°-190° C. 105 parts (1.48 moles) of gaseous chlorine is added beneath the surface in 8 hours. The reaction mixture is heated at 190° C. with nitrogen blowing for 2 hours and then stripped under vacuum at 190° C. The reaction mixture is filtered to yield the filtrate as the desired polyisobutene-substituted succinic acylating agent.

EXAMPLE 6

A mixture of 800 parts of a polyisobutene falling within the scope of the claims of the present invention and having a $\overline{M}n$ of about 2000, 646 parts of mineral oil and 87 parts of maleic anhydride is heated to 179° C. in 2.3 hours. At 176°-180° C. 100 parts of gaseous chlorine is added beneath the surface over a 19 hour period. The reaction mixture is stripped by blowing with nitrogen for 0.5 hour at 180° C. The residue is an oil-containing solution of the desired polyisobutene-substituted succinic acylating agent.

EXAMPLE 7

The procedure for Example 1 is repeated except the polyisobutene ($\overline{M}n=1845$; $\overline{M}w=5325$) is replaced on an equimolar basis by polyisobutene ($\overline{M}n=1457$; $\overline{M}w=5808$).

EXAMPLE 8

The procedure for Example 1 is repeated except the polyisobutene ($\overline{M}n=1845$; $\overline{M}w=5325$) is replaced on an equimolar basis by polyisobutene ($\overline{M}n=2510$; $\overline{M}w=5793$).

EXAMPLE 9

The procedure for Example 1 is repeated except the polyisobutene ($\overline{M}n=1845$; $\overline{M}w=5325$) is replaced on an equimolar basis by polyisobutene ($\overline{M}n=3220$; $\overline{M}w=5660$).

EXAMPLE 10

A mixture is prepared by the addition of 10.2 parts (0.25 equivalent) of a commercial mixture of ethylene polyamines having from about 3 to about 10 nitrogen atoms per molecule to 113 parts of mineral oil and 161 parts (0.25 equivalent) of the substituted succinic acylating agent prepared in Example 1 at 138° C. The reaction mixture is heated to 150° C. in 2 hours and stripped by blowing with nitrogen. The reaction mixture is filtered to yield the filtrate as an oil solution of the desired product.

EXAMPLE 11

A mixture is prepared by the addition of 57 parts (1.38 equivalents) of a commercial mixture of ethylene polyamines having from about 3 to 10 nitrogen atoms per molecule to 1,067 parts of mineral oil and 893 parts (1.38 equivalents) of the substituted succinic acylating agent prepared in Example 2 at 140° to 145° C. The reaction mixture is heated to 155° C. in 3 hours and stripped by blowing with nitrogen. The reaction mixture is filtered to yield the filtrate as an oil solution of the desired product.

EXAMPLE 12

A mixture is prepared by the addition of 18.2 parts (0.433 equivalent) of a commercial mixture of ethylene polyamines having from about 3 to 10 nitrogen atoms per molecule to 392 parts of mineral oil and 348 parts (0.52 equivalent) of the substituted succinic acylating agent prepared in Example 2 at 140° C. The reaction mixture is heated to 150° C. in 1.8 hours and stripped by blowing with nitrogen. The reaction mixture is filtered to yield the filtrate as an oil solution of the desired product.

EXAMPLE 13

A mixture of 334 parts (0.52 equivalent) of the polyisobutene substituted succinic acylating agent prepared in Example 2, 548 parts of mineral oil, 30 parts (0.88 equivalent) of pentaerythritol and 8.6 parts (0.0057 equivalent) of Polyglycol 112-2 demulsifier from Dow Chemical Company is heated at 150° C. for 2.5 hours. The reaction mixture is heated to 210° C. in 5 hours and held at 210° C. for 3.2 hours. The reaction mixture is cooled to 190° C. and 8.5 parts (0.2 equivalent) of a commercial mixture of ethylene polyamines having an average of about 3 to about 10 nitrogen atoms per molecule is added. The reaction mixture is stripped by heating at 205° C. with nitrogen blowing for 3 hours, then filtered to yield the filtrate as an oil solution of the desired product.

EXAMPLE 14

A mixture is prepared by the addition of 5500 parts of the oil solution of the substituted succinic acylating agent prepared in Example 7 to 3000 parts of mineral oil and 236 parts of a commercial mixture of ethylene polyamines having an average of about 3–10 nitrogen atoms per molecule at 150° C. over a one hour period. The reaction mixture is heated at 155°–165° C. for two hours, then stripped by blowing with nitrogen at 165° C. for one hour. The reaction mixture is filtered to yield the filtrate as an oil solution of the desired nitrogen-containing product.

Examples 15–33 are prepared by following the general procedure set forth in Example 10.

TABLE I

| Example Number | Succinic Acylating Agent Prepared In: | Reactant(s) | Ratio of Substituted Succinic Acylating Agent To Reactants | Percent Diluent |
|---|---|---|---|---|
| 15 | Example 3 | Pentaethylene hexamine[a] | 1:2 equivalents | 40% |
| 16 | Example 2 | ZnO[b]: polyamines[c] | 1:0.5:0.5 equivalents | 50% |
| 17 | Example 1 | Tris(2-aminoethyl)amine | 2:1 moles | 50% |
| 18 | Example 2 | Imino-bis-propylamine | 2:1 moles | 40% |
| 19 | Example 1 | Hexamethylene diamine | 1:2 moles | 40% |
| 20 | Example 1 | 1-(2-Aminoethyl)-2-methyl-2-imidazoline | 1:1 equivalents | 40% |
| 21 | Example 1 | N-aminopropylpyrrolidone | 1:1 moles | 40% |
| 22 | Example 1 | N,N-dimethyl-1,3-Propane diamine | 1:1 eqiuvalents | 40% |
| 23 | EXample 1 | N-(2-hydroxyethyl)-ethylene diamine | 1:1 equivalents | 40% |
| 24 | Example 1 | 1-amino-2-propanol | 1:1 equivalents | 40% |
| 25 | Example 1 | Ethylene diamine | 1:4 equivalents | 40% |
| 26 | Example 1 | 1,3-Propane diamine | 1:1 moles | 40% |
| 27 | Example 2 | 2-Pyrrolidinone | 1:1.1 mole | 20% |
| 28 | Example 1 | Urea | 1:0.625 mole | 50% |
| 29 | Example 7 | Diethylenetriamine[d] | 1:1 mole | 50% |
| 30 | Example 7 | Triethylenetetramine[e] | 1:0.5 mole | 50% |
| 31 | Example 7 | Aminoglycerol | 1:1 mole | 50% |
| 32 | Example 7 | Ethanolamine | 1:1 mole | 45% |
| 33 | Example 7 | Tris(hydroxymethyl)amino methane:polyamines[c] | 10:1:7 equivalents | 55% |

[a]A commerical mixture of ethylene polyamines corresponding in empirical formula to pentaethylene hexamine.
[b]In this example the ZnO is added with water to the polyisobutene-substituted succinic acylating agent and mineral oil mixture at 78° C., heated at 95° C. for 4 hours and then the preparation is completed according to the general procedure set forth in Example 10.
[c]A commerical mixture of ethylene polyamines having an average of 3-10 nitrogen atoms per molecule.
[d]A commerical mixture of ethylene polyamines corresponding in empirical formula to diethylenetriamine.
[e]A commerical mixture of ethylene polyamines corresponding in empirical formula to triethylenetetramine.

EXAMPLE 34

A mixture of 2130 parts (1.5 moles) of the polyisobutene-substituted succinic acylating agent prepared in Example 2, 187 parts (1.65 moles) of caprolactam, 575 parts of mineral oil and 2 parts of sodium hydroxide is heated at 190°–193° C. for two hours. The reaction mixture is stripped at 200° C. under vacuum and filtered at 150° C. to yield an oil solution of the desired product.

EXAMPLE 35

A mixture of 3225 parts (5.0 equivalents) of the polyisobutene-substituted succinic acylating agent prepared in Example 2, 289 parts (8.5 equivalents) of pentaerythritol and 5204 parts of mineral oil is heated at 225°–235° C. for 5.5 hours. The reaction mixture is filtered at 130° C. to yield an oil solution of the desired product.

EXAMPLE 36

A mixture of 631 parts of the oil solution of the product prepared in Example 35 and 50 parts of anthranilic acid is heated at 195°–212° C. for four hours. The reaction mixture is then filtered at 130° C. to yield an oil solution of the desired product.

EXAMPLE 37

A mixture is prepared by the addition of 14 parts of aminopropyl diethanolamine to 867 parts of the oil solution of the product prepared in Example 35 at 190°-200° C. The reaction mixture is held at 195° C. for 2.25 hours, then cooled to 120° C. and filtered. The filtrate is an oil solution of the desired product.

EXAMPLE 38

A mixture is prepared by the addition of 7.5 parts of piperazine to 867 parts of the oil solution of the product prepared in Example 35 at 190° C. The reaction mixture is heated at 190°-205° C. for two hours, then cooled to 130° C. and filtered. The filtrate is an oil solution of the desired product.

EXAMPLE 39

A mixture of 322 parts (0.5 equivalent) of the polyisobutene-substituted succinic acylating agent prepared in Example 2, 68 parts (2.0 equivalents) of pentaerythritol and 508 parts of mineral oil is heated at 204°-227° C. for five hours. The reaction mixture is cooled to 162° C. and 5.3 parts (0.13 equivalent) of a commercial ethylene polyamine mixture having an average of about 3 to 10 nitrogen atoms per molecule is added. The reaction mixture is heated at 162°-163° C. for one hour, then cooled to 130° C. and filtered. The filtrate is an oil solution of the desired product.

EXAMPLE 40

The procedure for Example 39 is repeated except the 5.3 parts (0.13 equivalent) of ethylene polyamine is replaced by 21 parts (0.175 equivalent) of tris(hydroxymethyl)aminomethane.

EXAMPLE 41

A mixture of 1480 parts of the polyisobutene-substituted succinic acylating agent prepared in Example 7, 115 parts (0.53 equivalent) of a commercial mixture of $C_{12-18}$ straight-chain primary alcohols, 87 parts (0.594 equivalent) of a commercial mixture of $C_{8-10}$ straight-chain primary alcohols, 1098 parts of mineral oil and 400 parts of toluene is heated to 120° C. At 120° C., 1.5 parts of sulfuric acid is added and the reaction mixture is heated to 160° C. and held for three hours. To the reaction mixture is then added 158 parts (2.0 equivalents) of n-butanol and 1.5 parts of sulfuric acid. The reaction mixture is heated at 160° C. for 15 hours, then 12.6 parts (0.088 equivalent) of aminopropyl morpholine is added. The reaction mixture is held at 160° C. for an additional six hours, stripped at 150° C. under vacuum and filtered to yield an oil solution of the desired product.

EXAMPLE 42

A mixture of 328 parts (0.5 equivalent) of the polyisobutene-substituted succinic acylating agent prepared in Example 1, 129 parts (1.0 equivalent) of 1-(2-hydroxyethyl)-2-pyrrolidone and 359 parts of mineral oil is heated at 190° C. for 4 hours. During the 4 hours at 190° C. water is removed continuously by blowing with nitrogen. The reaction mixture is filtered to yield the filtrate as an oil solution of the desired product.

EXAMPLE A

A mixture is prepared by the addition of 31 parts of carbon disulfide over a period of 1.66 hours to 853 parts of the oil solution of the product prepared in Example 15 at 113°-145° C. The reaction mixture is held at 145°-152° C. for 3.5 hours, then filtered to yield an oil solution of the desired product.

EXAMPLE B

A mixture of 62 parts of boric acid and 2720 parts of the oil solution of the product prepared in Example 10 is heated at 150° C. under nitrogen for six hours. The reaction mixture is filtered to yield the filtrate as an oil solution of the desired boron-containing product.

EXAMPLE C

An oleyl ester of boric acid is prepared by heating an equimolar mixture of oleyl alcohol and boric acid in toluene at the reflux temperature while water is removed azeotropically. The reaction mixture is then heated to 150° C. under vacuum and the residue is the ester having a boron content of 3.2% and a saponification number of 62. A mixture of 344 parts of the heater and 2720 parts of the oil solution of the product prepared in Example 10 is heated at 150° C. for six hours and then filtered. The filtrate is an oil solution of the desired boron-containing product.

EXAMPLE D

Boron trifluoride (34 parts) is bubbled into 2190 parts of the oil solution of the product prepared in Example 11 at 80° C. within a period of three hours. The resulting mixture is blown with nitrogen at 70°-80° C. for two hours to yield the residue as an oil solution of the desired product.

EXAMPLE E

A mixture of 3420 parts of the oil-containing solution of the product prepared in Example 12 and 53 parts of acrylonitrile is heated at reflux temperature from 125° C. to 145° C. for 1.25 hours, at 145° C. for three hours and then stripped at 125° C. under vacuum. The residue is an oil solution of the desired product.

EXAMPLE F

A mixture is prepared by the addition of 44 parts of ethylene oxide over a period of one hour to 1460 parts of the oil solution of the product prepared in Example 11 at 150° C. The reaction mixture is held at 150° C. for one hour, then filtered to yield the filtrate as an oil solution of the desired product.

EXAMPLE G

A mixture of 1160 parts of the oil solution of the product of Example 10 and 73 parts of terephthalic acid is heated at 150°-160° C. and filtered. The filtrate is an oil solution of the desired product.

EXAMPLE H

A decyl ester of phosphoric acid is prepared by adding one mole of phosphorus pentaoxide to three moles of decyl alcohol at a temperature within the range of 32° C. to 55° C. and then heating the mixture at 60°-63° C. until the reaction is complete. The product is a mixture of the decyl esters of phosphoric acid having a phosphorus content of 9.9% and an acid number of 250 (phenolphthalein indicator). A mixture of 1750 parts of the oil solution of the product prepared in Example 10 and 112 parts of the above decyl ester is heated at 145°-150° C. for one hour. The reaction mixture is filtered to yield the filtrate as an oil solution of the desired product.

EXAMPLE I

A mixture of 2920 parts of the oil solution of the product prepared in Example 11 and 69 parts of thiourea is heated to 80° C. and held at 80° C. for two hours. The reaction mixture is then heated at 150°-155° C. for four hours, the last of which the mixture is blown with nitrogen. The reaction mixture is filtered to yield the filtrate as an oil solution of the desired product.

EXAMPLE J

A mixture of 1460 parts of the oil solution of the product prepared in Example 11 and 81 parts of a 37% aqueous formaldehyde solution is heated at reflux for three hours. The reaction mixture is stripped under vacuum at 150° C. The residue is an oil solution of the desired product.

EXAMPLE K

A mixture of 1160 parts of the oil solution of the product prepared in Example 10 and 67 parts of sulfur monochloride is heated for one hour at 150° C. under nitrogen. The mixture is filtered to yield an oil solution of the desired sulfur-containing product.

EXAMPLE L

A mixture is prepared by the addition of 11.5 parts of formic acid to 1000 parts of the oil solution of the product prepared in Example 11 at 60° C. The reaction mixture is heated at 60°-100° C. for two hours, 92°-100° C. for 1.75 hours and then filtered to yield an oil solution of the desired product.

EXAMPLE M

A mixture is prepared by the addition of 58 parts of propylene oxide to 1170 parts of the oil solution of the product prepared in Example 35 and 10 parts of pyridine at 80°-90° C. The reaction mixture is then heated at 100°-120° C. for 2.5 hours and then stripped to 170° C. under vacuum. The residue is an oil solution of the desired product.

EXAMPLE N

A mixture of 1170 parts of the oil solution of the product prepared in Example 35 and 36 parts of maleic anhydride is heated to 200° C. over a 1.5 hour period and maintained at 200°-210° C. for 5.5 hours. During the last 1.5 hour period of heating, the reaction mixture is blown with nitrogen. The reaction mixture is stripped to 190° C. under vacuum, then filtered to yield the filtrate as an oil solution of the desired product.

EXAMPLE O

A mixture of 1000 parts of the oil solution of the product prepared in Example 39 and 10 parts of sulfur is heated at 160° C. for two hours, then at 160°-180° C. for one hour. The reaction mixture is cooled to 120° C. and filtered to yield the filtrate as an oil solution of the desired product.

The V.I. improving properties of the dispersant/detergents of this invention (i.e., carboxylic derivative compositions) are illustrated by a comparison of the following lubricant oil compositions. One lubricating oil composition contains a known dispersant/detergent prepared from a polybutenyl-substituted succinic anhydride and a combination of amines and alcohols as used in Example 39. The other lubricating oil composition is an analogous composition differing in that the polyisobutenyl-substituted anhydride of the prior art dispersant/detergent is replaced with an acylating reagent of Example 1. In both cases, the lubricating compositions contain the same base oil, 1.23% by volume of a basic calcium sulfonate, 1% by volume of a zinc dialkyldithiophosphonate, 0.5% by volume of a basic calcium sulfur-bridged alkylphenol, and 0.2% by volume of a sulfurized Diels Alder adduct. In order to meet the viscosity parameters of a 10W-30 crankcase oil, the lubricant composition using the known dispersant/detergent required 3.2% by weight of the dispersant/detergent and 9.75% by volume of a commercial Acryloid V.I. improver. With the carboxylic acid derivative composition of this invention, only 3% by weight of the analogous dispersant/detergent and only 4% by volume of the same V.I. improver is required.

To illustrate the ability of the carboxylic acid compositions of this invention to effectively treat mineral oils having a high aromatic content (e.g., 3-10% by weight aromatic content) further reference is made to the immediately above-described lubricating compositions. With the known dispersant/detergent referred to above, 6% by volume is required to enable the lubricant to meet certain performance requirements. By replacing the known dispersant/detergent with 3.5% by volume of the product of Example 10, the resulting lubricating composition satisfies those same requirements. The carboxylic derivative compositions, however, are also completely effective in treating mineral oils free from aromatic components or having less than about 3% by weight aromatic components.

What is claimed is:

1. A lubricating composition comprising a major amount of oil of lubricating viscosity and a minor amount of one or more carboxylic derivative compositions produced by reacting at least one substituted succinic acylating agent with a reactant selected from the group consisting of (a) amine characterized by the presence within its structure of at least one H—N< group, (b) alcohol, (c) reactive metal or reactive metal compound, and (d) a combination of two or more of any of (a) through (c), the components of (d) being reacted with said one or more substituted succinic acylating agents simultaneously or sequentially in any order, wherein said substituted succinic acylating agents consist of substituent groups and succinic groups wherein the substituent groups are derived from polyalkene, said polyalkene being characterized by a Mn value of 1300 to about 5000 and a Mw/Mn value of about 1.5 to about 4, said acylating agents being characterized by the presence within their structure of an average of at least 1.3 succinic groups for each equivalent weight of substituent groups.

2. Lubricating compositions according to claim 1 wherein the succinic groups correspond to the formula

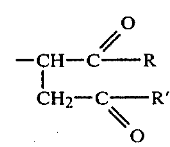

wherein R and R' are each independently selected from the group consisting of —OH, —Cl, —O—lower alkyl and, when taken together, R and R' are —O—, with the proviso that all the succinic groups need not be the same.

3. Lubricating compositions according to claim 2 wherein the substituent groups are derived from one or more polyalkene selected from the group consisting of homopolymers and interpolymers of terminal olefins of two to about sixteen carbon atoms, with the proviso that said interpolymers can optionally contain up to about 40% of polymer units derived from internal olefins of up to about sixteen carbon atoms.

4. Lubricating compositions according to claim 3 wherein said value of Mn is at least about 1500.

5. Lubricating compositions according to claim 4 wherein said value of Mw/Mn is at least about 1.8.

6. Lubricating compositions according to claim 5 wherein the substituent groups are derived from one or more polyalkene selected from the group consisting of homopolymers and interpolymers of terminal olefins of two to about six carbon atoms, with the proviso that said interpolymers can optionally contain up to about 25% of polymer units derived from internal olefins of up to about six carbon atoms.

7. Lubricating compositions according to claim 6 wherein the substituent groups are derived from a member selected from the group consisting of polybutene, ethylene-propylene copolymer, polypropylene, and mixtures of two or more of any of these.

8. Lubricating compositions according to claim 7 wherein said acylating agents are characterized by the presence within their structure of an average of at least 1.4 succinic groups for each equivalent weight of the substituent groups.

9. Lubricating compositions according to claim 8 wherein said value of Mn is about 1500 to about 2800.

10. Lubricating compositions according to claim 9 wherein said value of Mw/Mn is about 2.0 to about 3.4.

11. Lubricating compositions according to claim 10 wherein the acylating agents are characterized by the presence within their structure of at least 1.5 up to about 2.5 succinic groups for each equivalent weight of the substituent groups.

12. Lubricating compositions according to claim 11 wherein the substituent groups are derived from polybutene in which at least about 50% of the total units derived from butenes is derived from isobutene.

13. Lubricating compositions according to claim 12 wherein said value of Mn is about 1500 to about 2400.

14. Lubricating compositions according to claim 13 wherein said value of Mw/Mn is about 2.5 to about 3.2.

15. Lubricating compositions according to claim 14 wherein the succinic groups correspond to the formulae

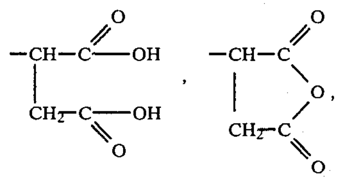

mixtures of these.

16. A lubricating composition comprising a major amount of oil of lubricating viscosity and a minor amount of one or more carboxylic derivative compositions produced by reacting at least one substituted acylating composition with a reactant selected from the group consisting of (a) amine characterized by the presence within its structure of at least one H—N< group, (b) alcohol, (c) reactive metal or reactive metal compound, and (d) a combination of two or more of any of (a) through (c), the components of (d) being reacted with said one or more substituted acylating compositions simultaneously or sequentially in any order, wherein said one or more substituted acylating compositions are prepared by heating at a temperature of at least about 140° C.:

(A) Polyalkene characterized by a Mn value of 1300 to about 5000 and a Mw/Mn value of about 1.5 to about 4, (B) One or more acidic reactants of the formula

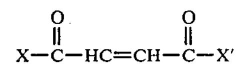

wherein X and X' are the same or different provided at least one of X and X' is such that the substituted acylating compositions can function as carboxylic acylating agents, (C) Chlorine wherein the mole ratio of (A):(B) is such that there is at least 1.3 moles of (B) for each mole of (A) where the number of moles of (A) is the quotient of the total weight of (A) divided by the value of Mn, and the amount of chlorine employed is such as to provide at least about 0.2 mole of chlorine for each mole of (B) to be reacted with (A), said substituted acylating compositions being characterized by at least 1.3 groups derived from (B) for each equivalent weight of the substituent groups derived from (A).

17. Lubricating compositions according to claim 16 wherein said reactant is (b) or a combination of (a) and (b).

18. Lubricating compositions according to claim 17 wherein the amount of chlorine employed is such as to provide at least about one mole of chlorine for each mole of (B) to be reacted with (A).

19. Lubricating compositions according to claim 18 wherein the temperature is from about 160° C. to about 220° C.

20. Lubricating compositions according to claim 19 wherein (A) is one or more polyalkenes selected from the group consisting of homopolymers and interpolymers of terminal olefins of two to about sixteen carbon atoms with the proviso that said interpolymers can optionally contain up to about 40% of polymer units derived from internal olefins of up to about sixteen carbon atoms.

21. Lubricating compositions according to claim 20 wherein said value of Mn is at least about 1500.

22. Lubricating compositions according to claim 21 wherein said value of Mw/Mn is at least about 1.8.

23. Lubricating compositions according to claim 22 wherein (A) is one or more polyalkenes selected from the group consisting of homopolymers and interpolymers of terminal olefins of two to about six carbon atoms with the proviso that said interpolymers can optionally contain up to about 25% of polymer units derived from internal olefins of up to about six carbon atoms.

24. Lubricating compositions according to claim 23 wherein (A) is selected from the group consisting of polybutene, ethylene-propylene copolymer, polypropylene, and mixtures of two or more of any of these.

25. Lubricating compositions according to claim 24 wherein the acylating agents are characterized by the presence within their structure of an average of at least 1.4 succinic groups derived from (B) for each equivalent weight of the substituent groups derived from (A).

26. Lubricating compositions according to claim 25 wherein said value of Mn is about 1500 to about 2800.

27. Lubricating compositions according to claim 26 wherein said value of Mw/Mn is about 2.0 to about 3.4.

28. Lubricating compositions according to claim 27 characterized by the presence within their structure of at least 1.5 succinic groups up to about 2.5 succinic groups for each equivalent weight of the substituent groups derived from (A).

29. Lubricating compositions according to claim 28 wherein (A) is polybutene in which at least about 50% of the total units derived from butenes is derived from isobutene.

30. Lubricating compositions according to claim 29 wherein said value of Mn is about 1500 to about 2400.

31. Lubricating compositions according to claim 30 wherein said value of Mw/Mn is about 2.5 to about 3.2.

32. Lubricating compositions according to claim 31 wherein the groups derived from (B) correspond to the formulae

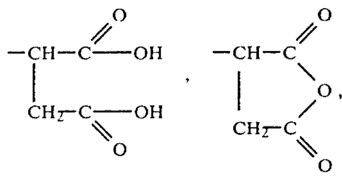

and mixtures of these.

33. Lubricating compositions according to claim 16 wherein said one or more substituted acylating compositions are prepared by heating at a temperature of about 160° C. to about 220° C. a mixture comprising:

(A) Polybutene characterized by a Mn value of about 1700 to about 2400 and a Mw/Mn value of about 2.5 to about 3.2, in which at least 50% of the total units derived from butenes is derived from isobutene, (B) One or more acidic reactants of the formula

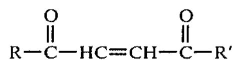

wherein R and R' are each independently selected from the group consisting of —OH and, when taken together, R and R' are —O—, and (C) Chlorine wherein the mole ratio of (A):(B) is such that there is at least 1.5 moles of (B) for each mole of (A) and the number of moles of (A) is the quotient of the total weight of (A) divided by the value of Mn, and the amount of chlorine employed is such as to provide at least about one mole of chlorine for each mole of (B) to be reacted with (A), said acylating compositions being characterized by the presence within their structure of an average of at least 1.5 groups derived from (B) for each equivalent weight of the substituent groups derived from (A).

34. Lubricating compositions according to claim 33 wherein said reactant is (b) or a combination of (a) and (b).

35. A lubricating composition comprising a major amount of an oil of lubricating viscosity and a minor amount of at least one post-treated carboxylic derivative composition, wherein said carboxylic derivative composition is as described in claim 1 in which the reactant is (a), said at least one post-treated carboxylic derivative composition having been prepared by reacting said carboxylic derivative composition with one or more post-treating reagents selected from the group consisting of boron oxide, boron oxide hydrate, boron halides, boron acids, esters of boron acids, carbon disulfide, $H_2S$ sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols.

36. A lubricating composition comprising a major amount of an oil of lubricating viscosity and a minor amount of at least one post-treated carboxylic derivative composition, wherein said carboxylic derivative composition is as described in claim 1 in which the reactant is (b), said at least one post-treated carboxylic derivative composition having been prepared by reacting said carboxylic derivative composition with one or more post-treating reagents selected from the group consisting of boron oxide, boron oxide hydrate, boron halides, boron acids, esters of boron acids, sulfur, sulfur chlorides, phosphorus sulfides, phosphorus oxides, carboxylic acid acylating agents, epoxides, and episulfides.

37. A lubricating composition comprising a major amount of an oil of lubricating viscosity and a minor amount of at least one post-treated carboxylic derivative composition, wherein said carboxylic derivative composition is as described in claim 1 in which the reactant is a combination of (a) and (b), said at least one post-treated carboxylic derivative composition having been prepared by reacting said carboxylic derivative composition with one or more post-treating reagents selected from the group consisting of boron oxide, boron oxide hydrate, boron halides, boron acids, esters of boron acids, carbon disulfide, $H_2S$ sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols.

38. A lubricating composition comprising a major amount of an oil of lubricating viscosity and a minor amount of at least one post-treated carboxylic derivative composition, wherein said carboxylic derivative composition is as described in claim 16 in which the reactant is (a), said at least one post-treated carboxylic derivative composition having been prepared by reacting said carboxylic derivative composition with one of more post-treating reagents selected from the group consisting of boron oxide, boron oxide hydrate, boron halides, boron acids, esters of boron acids, carbon disulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols.

39. A lubricating composition comprising a major amount of an oil of lubricating viscosity and a minor amount of at least one post-treated carboxylic derivative composition wherein said carboxylic derivative composition is as described in claim 16 in which the reactant is (b), said at least one post-treated carboxylic derivative composition having been prepared by reacting said carboxylic derivative composition with one or more post-treating reagents selected from the group consisting of boron oxide, boron oxide hydrate, boron halides, boron acids, esters of boron acids, sulfur, sulfur chlorides, phosphorus sulfides, phosphorus oxides, carboxylic acid acylating agents, epoxides, and episulfides.

40. A lubricating composition comprising a major amount of an oil of lubricating viscosity and a minor amount of at least one post-treated carboxylic derivative composition wherein said carboxylic derivative composition is as described in claim 16 in which the reactant is a combination of (a) and (b) with one or more post-treating reagents selected from the group consisting of boron oxide, boron oxide hydrate, boron halides, boron acids, esters of boron acids, carbon disulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols.

41. A concentrate for formulating lubricating compositions comprising from about 20 to about 90% by weight of a normally liquid, substantially inert organic solvent/diluent and from about 10% to about 80% by weight of at least one carboxylic derivative composition as described in claim 1.

42. A concentrate for formulating lubricating compositions comprising from about 20 to about 90% by weight of a normally liquid, substantially inert organic solvent/diluent and from about 10% to about 80% by weight of at least one carboxylic derivative composition as described in claim 16.

43. A concentrate for formulating lubricating compositions comprising from about 20 to about 90% by weight of a normally liquid, substantially inert organic solvent/diluent and from about 10% to about 80% by weight of at least one carboxylic derivative composition as described in claim 33.

44. A concentrate for formulating lubricating compositions comprising from about 20 to about 90% by weight of a normally liquid, substantially inert organic solvent/diluent and from about 10% to about 80% by weight of at least one post-treated carboxylic derivative composition as described in claim 35.

45. A concentrate for formulating lubricating compositions comprising from about 20 to about 90% by weight of a normally liquid, substantially inert organic solvent/diluent and from about 10% to about 80% by weight of at least one post-treated carboxylic derivative composition as described in claim 36.

46. A concentrate for formulating lubricating compositions comprising from about 20 to about 90% by weight of a normally liquid, substantially inert organic solvent/diluent and from about 10% to about 80% by weight of at least one post-treated carboxylic derivative composition as described in claim 37.

47. A concentrate for formulating lubricating compositions comprising from about 20 to about 90% by weight of a normally liquid, substantially inert organic solvent/diluent and from about 10% to about 80% by weight of at least one post-treated carboxylic derivative composition as described in claim 38.

48. A concentrate for formulating lubricating compositions comprising from about 20 to about 90% by weight of a normally liquid, substantially inert organic solvent/diluent and from about 10% to about 80% by weight of at least one post-treated carboxylic derivative composition as described in claim 39.

49. A concentrate for formulating lubricating compositions comprising from about 20 to about 90% by weight of a normally liquid, substantially inert organic solvent/diluent and from about 10% to about 80% by weight of at least one post-treated carboxylic derivative composition as described in claim 40.

50. A lubricating composition comprising a major amount of oil of lubricating viscosity and a minor amount of at least one substituted succinic acylating agent consisting of substituent groups and succinic groups wherein the substituent groups are derived from polyalkene, said polyalkene being characterized by a Mn value of 1300 to about 5000 and a Mw/Mn value of about 1.5 to about 4, said acylating agents being characterized by the presence within their structure of an average of at least 1.3 succinic groups for each equivalent weight of substituent groups.

51. A lubricating composition according to claim 50 wherein the succinic groups correspond to the formula

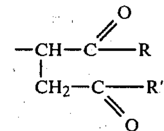

wherein R and R' are each independently selected from the group consisting of —OH, —Cl, —O—lower alkyl and, when taken together, R and R' and —O—, with the proviso that all the succinic groups need not be the same.

52. A lubricating composition according to claim 51 wherein the substituent groups are derived from one or more polyalkene selected from the group consisting of homopolymers and interpolymers of terminal olefins of two to about sixteen carbon atoms, with the proviso that said interpolymers can optionally contain up to about 40% of polymer units derived from internal olefins of up to about sixteen carbon atoms.

53. A lubricating composition comprising a major amount of oil of lubricating viscosity and a minor amount of at least one substituted acylating composition prepared by heating at a temperature of at least about 140° C.:

(A) Polyalkene characterized by Mn value of 1300 to about 5000 and a Mw/Mn value of about 1.5 to about 4, (B) One or more acidic reactants of the formula $$X-\overset{O}{\overset{\|}{C}}-HC=CH-\overset{O}{\overset{\|}{C}}-X'$$

wherein X and X' are the same or different provided at least one of X and X' is such that the substituted acylating compositions can function as carboxylic acylating agents, (C) Chlorine wherein the mole ratio of (A):(B) is such that there is at least 1.3 moles of (B) for each mole of (A) where the number of moles of (A) is the quotient of the total weight of (A) divided by the value of Mn, and the amount of chlorine employed is such as to provide at least about 0.2 mole of chlorine for each mole of (B) to be reacted with (A), said substituted acylating compositions being characterized by the presence within its structure of an average of at least 1.3 groups derived from (B) for each equivalent weight of the substituent groups derived from (A).

54. A lubricating composition according to claim 53 wherein the amount of chlorine employed is such as to provide at least about one mole of chlorine for each mole of (B) to be reacted with (A).

55. A lubricating composition according to claim 54 wherein the temperature is from about 160° C. to about 220° C.

56. A lubricating composition according to claim 55 wherein (A) is one or more polyalkenes selected from the group consisting of homopolymers and interpolymers of terminal olefins of two to about sixteen carbon atoms with the proviso that said interpolymers can optionally contain up to about 40% of polymer units derived from internal olefins of up to about sixteen carbon atoms.

57. A concentrate for formulating lubricating compositions comprising from about 20 to about 90% by weight of a normally liquid, substantially inert organic solvent/diluent and from about 10% to about 80% by weight of at least one substituted succinic acylating agent as described in claim 50.

58. A concentrate for formulating lubricating compositions comprising from about 20 to about 90% by weight of a normally liquid, substantially inert organic solvent/diluent and from about 10% to about 80% by weight of at least one substituted acylating composition according to claim 53.

59. A method for increasing the viscosity index of a lubricating oil composition comprising adding to said oil a minor, viscosity-index improving amount of one or more carboxylic derivative compositions produced by reacting at least one substituted succinic anhydride acylating agent with a reactant selected from the group consisting of (a) amine characterized by the presence within its structure of at least one H—N< group, (b) alcohol, (c) reactive metal or reactive metal compound, and (d) a combination of two or more of any of (a) through (c), the components of (d) being reacted with said one or more substituted succinic acylating agents simultaneously or sequentially in any order, wherein said substituted succinic acylating agents consist of substituent groups and succinic groups wherein the substituent groups are derived from polyalkene, said polyalkene being characterized by a Mn value of 1300 to about 5000 and a Mw/Mn value of about 1.5 to about 4, said acylating agents being characterized by the presence within their structure of an average of at least 1.3 succinic groups for each equivalent weight of substituent groups.

60. A method as claimed in claim 59 wherein the succinic groups correspond to the formula

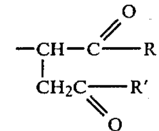

wherein R and R' are each independently selected from the group consisting of —OH, —Cl, —O—lower alkyl and, when taken together, R and R' are —O—, with the proviso that all the succinic groups need not be the same.

61. A method as claimed in claim 60 wherein said value of Mn is at least about 1500 and said value of Mw/Mn is at least about 1.8.

62. A method as claimed in claim 61 wherein said substituent groups are derived from a member selected from the group consisting of polybutene, ethylenepropylene copolymer, polypropylene, and mixtures of two or more of any of these and said acylating agents are characterized by the presence within their structure of an average of at least 1.4 succinic groups for each equivalent weight of the substituent groups.

63. A method for increasing the viscosity index of a lubricating oil comprising adding to said oil a minor, viscosity-index-improving amount of one or more carboxylic derivative compositions produced by reacting at least one substituted acylating composition with a reactant selected from the group consisting of (a) amine characterized by the presence within its structure of at least one H—N< group, (b) alcohol, (c) reactive metal or reactive metal compound, and (d) a combination of two or more of any of (a) through (c), the components of (d) being reacted with said one or more substituted acylating compositions simultaneously or sequentially in any order, wherein said one or more substituted acylating compositions are prepared by heating at a temperature of at least about 140° C.:

(A) Polyalkene characterized by a Mn value of 1300 to about 5000 and a Mw/Mn value of about 1.5 to about 4, (B) One or more acidic reactants of the formula

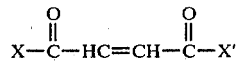

wherein X and X' are the same or different provided at least one of X and X' is such that the substituted acylating compositions can function as carboxylic acylating agents, (C) Chlorine wherein the mole ratio of (A):(B) is such that there is at least 1.3 moles of (B) for each mole of (A) where the number of moles of (A) is the quotient of the total weight of (A) divided by the value of Mn, and the amount of chlorine employed is such as to provide at least about 0.2 mole of chlorine for each mole of (B) to be reacted with (A), said substituted acylating compositions being characterized by at least 1.3 groups derived from (B) for each equivalent weight of the substituent groups derived from (A).

64. A method as claimed in claims 59, 60, 61, 62 or 63 wherein said carboxylic derivative compositions are the only non-hydrocarbyl viscosity-index-improving agents present in the oil.

65. A method as claimed in claims 59, 60, 61, 62 or 63 wherein said carboxylic derivative compositions are the only viscosity-index-improving agents present in the oil.

* * * * *